(12) United States Patent
Hashidzume et al.

(10) Patent No.: US 6,476,153 B2
(45) Date of Patent: Nov. 5, 2002

(54) PROCESS FOR PRODUCING HYDROGENATED α-OLEFIN-DICYCLOPENTADIENE COPOLYMER, METHOD FOR MOLDING THE SAME AND OPTICAL MATERIAL

(75) Inventors: Kiyonari Hashidzume, Hino (JP); Kaoru Iwata, Hino (JP)

(73) Assignee: Teijin Limited, Osaka (JP)

( * ) Notice: Subject to any disclaimer, the term of this patent is extended or adjusted under 35 U.S.C. 154(b) by 53 days.

(21) Appl. No.: 09/801,733

(22) Filed: Mar. 9, 2001

(65) Prior Publication Data

US 2001/0009950 A1 Jul. 26, 2001

Related U.S. Application Data

(63) Continuation of application No. 09/329,302, filed on Jun. 10, 1999, now Pat. No. 6,232,407.

(30) Foreign Application Priority Data

Jun. 10, 1998 (JP) .............................. 10-161968
Jun. 22, 1998 (JP) .............................. 10-174797

(51) Int. Cl.$^7$ ................................. C08F 8/04
(52) U.S. Cl. ................. 525/331.7; 525/332.1; 525/338; 525/339
(58) Field of Search ................. 525/338, 339, 525/331.7, 332.1

(56) References Cited

U.S. PATENT DOCUMENTS 5,206,306 A 4/1993 Shen 5,462,995 A 10/1995 Hosaka et al.

FOREIGN PATENT DOCUMENTS

| EP | 0 505 110 | 9/1992 |
|---|---|---|
| EP | 0 845 484 | 6/1998 |
| JP | 63-243103 | 10/1988 |
| JP | 64/54011 | 3/1989 |
| JP | 5-17527 | 1/1993 |
| JP | 8-239415 | 9/1996 |
| JP | 11-116614 | 4/1999 |
| WO | 96/03445 | 2/1996 |
| WO | 98/33830 | 8/1998 |

OTHER PUBLICATIONS

Yoshio; "Production of Hydrogenated Dicyclopentadiene-–Ethylene Copolymer"; vol. 013, No. 049; Feb. 3, 1989; Publication No. 63 243103; Publication date; Oct. 11, 1988.
Database WPI; Section Ch, Week 8844; Class A18, AN 88–312249; XP002115685; & JP 63 230707; Sep. 27, 1988; Abstract.
Database WPI; Section Ch, Week 9548; Class A12, AN–95–371189; XP002115686; & JP 07 252316; Oct. 3, 1995; Abstract.

Primary Examiner—Bernard Lipman
(74) Attorney, Agent, or Firm—Rader, Fishman & Grauer PLLC

(57) ABSTRACT

Process for producing a hydrogenated α-olefin-dicyclopentadiene copolymer. The process includes a step of distilling of unreacted dicyclopentadiene or tetrahydrodicyclopentadiene which is a hydrogenated product of unreacted dicyclopentadiene from a mixture containing α-olefin-dicyclopentadiene copolymer or its hydrogenated product in the presence of a high-boiling hydrocarbon solvent having a boiling point of 195 to 300° C. and an ignition point of 260° C. or more. Method for melt molding the hydrogenated α-olefin-dicyclopentadiene copolymer is also proposed.

28 Claims, 7 Drawing Sheets

PROCESS FOR PRODUCING HYDROGENATED α-OLEFIN-DICYCLOPENTADIENE COPOLYMER, METHOD FOR MOLDING THE SAME AND OPTICAL MATERIAL

This is a continuation of Ser. No. 09/329,302 filed Jun. 10, 1999 now U.S. Pat. No. 6,232,407.

DETAILED DESCRIPTION OF THE INVENTION

The present invention relates to a process for producing a hydrogenated α-olefin-dicyclopentadiene copolymer, a method for molding the same and an optical material obtained from the same.

Alpha-olefin-cyclic olefin copolymers obtained by the addition-copolymerization of an α-olefin and a cyclic olefin are synthetic resins having excellent transparency, heat aresistance, weatherability, chemical resistance, solvent resistance, dielectric characteristics and various mechanical properties and are widely used in various fields.

These α-olefin-cyclic olefin copolymers are generally produced by the addition-copolymerization of an α-olefin and a cyclic olefin in a hydrocarbon-based solvent such as toluene, cyclohexane or hexane in the presence of an addition polymerization catalyst.

When a copolymer of an α-olefin and a cyclic olefin having at least two double bonds between carbons, namely, a cyclic polyene, is used as a resin, the double bonds between carbons contained in the copolymer must be saturated by hydrogenation to improve heat resistance, weatherability and light resistance. The hydrogenation of a polymer is generally carried out through a reaction between a copolymer and hydrogen in the presence of a heterogeneous or homogeneous hydrogenation catalyst.

The inventors of the present invention have found that, among α-olefin-cyclic polyene copolymers, an α-olefin-dicyclopentadiene copolymer, which is obtained when dicyclopentadiene is used as a cyclic polyene, does not contain the linkages of the dicyclopentadiene and has high chemical homogeneity and that a hydrogenated α-olefin-dicyclopentadiene copolymer is particularly excellent in optical homogeneity and transparency and suitable for use as an optical material for an optical disk substrate or the like and have previously proposed the copolymer (WO98/33830).

The hydrogenated α-olefin-dicyclopentadiene copolymer is generally produced through the step of polymerizing an α-olefin and dicyclopentadiene in a hydrocarbon solvent, the step of hydrogenating the obtained α-olefin-dicyclopentadiene copolymer, the step of removing the catalyst and the step of removing volatile components.

In the polymerization reaction step, in order to obtain a copolymer having high chemical homogeneity, it is extremely important to maintain the ratio of the α-olefin to the dicyclopentadiene at a value higher than a predetermined value. As a result, unreacted dicyclopentadiene inevitably remains in a solution after polymerization. In the subsequent hydrogenation reaction step, the residual dicyclopentadiene is hydrogenated together with the copolymer to be converted into tetrahydrodicyclopentadiene and eventually separated from the hydrogenated copolymer together with the solvent in the step of removing volatile components.

The ignition point of the by-produced tetrahydrodicyclopentadiene is 235° C., which is much lower than that of a commonly used solvent (toluene: 480° C., cyclohexane: 260° C.). Therefore, it is not preferred from the viewpoint of preventing a danger to keep a polymer solution containing tetrahydrodicyclopentadiene at a temperature higher than 235° C. in ordinary equipment, even if it is in an inert atmosphere. This problem can be solved by using perfect airtight equipment but a great load is imposed on equipment in an industrial-scale production. Therefore, it is very difficult to produce the hydrogenated α-olefin-dicyclopentadiene copolymer on an industrial scale.

JP-A 64-54011, JP-A 5-17527 and JP-A 8-239415 (the term "JP-A" as used herein means an "unexamined published Japanese patent application") disclose solvents used for a copolymerization reaction between an α-olefin and dicyclopentadiene and JP-A 63-243103 discloses a solvent used for the hydrogenation reaction of an ethylene-dicyclopentadiene copolymer. Most of the solvents are compounds having a boiling point lower than the boiling point of tetrahydrodicyclopentadiene (194° C. at 760 mmHg). When a solvent having such a low boiling point is used, the solvent is first distilled off in the step of removing volatile components and then tetrahydrodicyclopentadiene is distilled off. However, when the solvent is almost completely distilled off, the hydrogenated copolymer becomes solid at a temperature lower than the ignition point of tetrahydrodicyclopentadiene, thereby making it extremely difficult to completely distill off tetrahydrodicyclopentadiene. Some solvents having a boiling point higher than that of tetrahydrodicyclopentadiene are also enumerated. All of them, however, have a high melting point and are not suitable for use in a polymerization reaction or have a low ignition point of around 250° C. or low solubility for polymers. Therefore, they cannot be used in actual production.

As described above, tetrahydrodicyclopentadiene cannot be removed from the copolymer solution safely and efficiently by conventionally known methods.

When a commonly used hydrocarbon-based solvent such as toluene or cyclohexane is used, there arises another serious problem to be solved in the step of removing volatile components. Since the boiling point of the hydrocarbon-based solvent is lower than the melting temperature of the polymer by 100° C. or more, the polymer becomes solid when the solvent is completely distilled off, thereby making stirring extremely difficult. It is possible to obtain a molten polymer without passing through a solid state by carrying out the operation of removing volatile components in a pressurization system and increasing the boiling point of the solvent. However, the control of a reaction is extremely difficult and a great load is imposed on equipment. Thus, there has been no method for directly converting the polymer from a solution state into a molten state with ease, and the development of this method has been desired.

On the other hand, not only transparency but also various characteristic properties such as optical isotropy (low birefringence), dimensional stability, weatherability and thermal stability are required for plastics used as an optical material for optical disk substrates and optical lenses and the like. For these optical applications, polycarbonates and poly(methyl methacrylate) have been mainly used. However, molded products of polycarbonates are liable to show optical anisotropy due to large specific birefringence, whereas poly(methyl methacrylate) are inferior in dimensional stability due to extremely high water absorption and have low heat resistance. Although polycarbonates are mainly used for optical disk substrates nowadays, there arise concerns about such problems as the large birefringence of the polycarbonates and the warp of a disk by moisture absorption, along with a recent attempt to increase the capacity of a magneto-optical recording disk (MOD) or to increase the recording density as typified by the development of a digital video disk (DVD).

In view of the above situation, the development of cyclic olefin polymers as substitutes for polycarbonates is now under way intensively. These cyclic olefin-based resins are expected to be used as thermoplastic transparent resins having small birefringence and high heat resistance for an optical material for optical lenses and optical sheets in addition to optical disk substrates.

It is an object of the present invention to provide a process for producing a hydrogenated α-olefin-dicyclopentadiene copolymer.

It is another object of the present invention to provide a process for producing a hydrogenated α-olefin-dicyclopentadiene copolymer, which is capable of removing unreacted dicyclopentadiene or tetrahydrodicyclopentadiene, which is the hydrogenated product of dicyclopentadiene, safely and efficiently.

It is still another object of the present invention to provide a method for melt molding of a hydrogenated α-olefin-dicyclopentadiene copolymer.

It is a further object of the present invention to provide a method for melt molding of a hydrogenated α-olefin-dicyclopentadiene copolymer, which is suitable for producing an optical material that is rarely colored and free from a fish eye or silver streak and that has excellent transparency and moldability, such as an optical disk substrate, optical lens or optical sheet.

It is a still further object of the present invention to provide an optical material obtained by the melt molding method of the present invention.

Other objects and advantages of the present invention will become apparent from the following description.

According to the present invention, firstly, the above objects and advantages of the present invention are attained by a process for producing a hydrogenated α-olefin-dicyclopentadiene copolymer (may be referred to as "the first production process of the present invention" hereinafter) comprising:

(1) the step of addition-polymerization of an α-olefin having 2 or more carbon atoms and dicyclopentadiene in a hydrocarbon solvent in the presence of a polymerization catalyst, and then removing the polymerization catalyst as required, to produce an α-olefin-dicyclopentadiene copolymer solution containing unreacted dicyclopentadiene;

(2) the step of adding a hydrogenation catalyst to the copolymer solution produced in the step (1) to hydrogenate the unsaturated double bonds of the α-olefin-dicyclopentadiene copolymer so as to produce a mixture containing a hydrogenated α-olefin-dicyclopentadiene copolymer; and (3) the step of distilling of tetrahydrodicyclopentadiene formed in the hydrogenation reaction of the step (2) from the mixture containing a hydrogenated α-olefin-dicyclopentadiene copolymer produced in the previous step, wherein at least one of the following operations (i), (ii) and (iii) is carried out to ensure that a high-boiling hydrocarbon solvent is existent in an amount of at least 10 parts by weight based on 100 parts by weight of the hydrogenated α-olefin-dicyclopentadiene copolymer at the end of the step (3):

(i) use of a high-boiling hydrocarbon solvent as at least part of the hydrocarbon solvent of the step (1), (ii) addition of a high-boiling hydrocarbon solvent in the step (2), and (iii) addition of a high-boiling hydrocarbon solvent in the step (3); and the high-boiling hydrocarbon solvent contains at least a hydrocarbon solvent having a boiling point at normal pressure of 195 to 300° C. and an ignition point of 260° C. or more.

Secondly, the above objects and advantages of the present invention are attained by a process for producing a hydrogenated α-olefin-dicyclopentadiene copolymer (may be referred to as "the second production process of the present invention" hereinafter) comprising:

(1') the step of addition-polymerizing an α-olefin having 2 or more carbon atoms and dicyclopentadiene in a hydrocarbon solvent in the presence of a polymerization catalyst, and then removing the polymerization catalyst as required, to produce an α-olefin-dicyclopentadiene copolymer solution containing unreacted dicyclopentadiene;

(2') the step of distilling off the unreacted dicyclopentadiene from the α-olefin-dicyclopentadiene copolymer solution containing the unreacted dicyclopentadiene produced in the step (1') to produce an α-olefin-dicyclopentadiene copolymer solution containing substantially no dicyclopentadiene; and (3') adding a hydrogenation catalyst to the α-olefin-dicyclopentadiene copolymer solution produced in the previous step to hydrogenate the unsaturated double bonds of the α-olefin-dicyclopentadiene copolymer to produce a mixture containing a hydrogenated α-olefin-dicyclopentadiene copolymer, wherein at least one of the following operations (i') and (ii') is carried out to ensure that a high-boiling hydrocarbon solvent is existent in an amount of at least 10 parts by weight based on 100 parts by weight of the α-olefin-dicyclopentadiene copolymer at the end of the above step (2'):

(i') use of a high-boiling hydrocarbon solvent as at least part of the hydrocarbon solvent of step (1'), and (ii') addition of a high-boiling hydrocarbon solvent in step (2'); and the high-boiling hydrocarbon solvent contains at least a hydrocarbon solvent having a boiling point at normal pressure of 195 to 300° C. and an ignition point of 260° C. or more.

The melt molding method and the optical material of the present invention will be described later.

Figure 1:
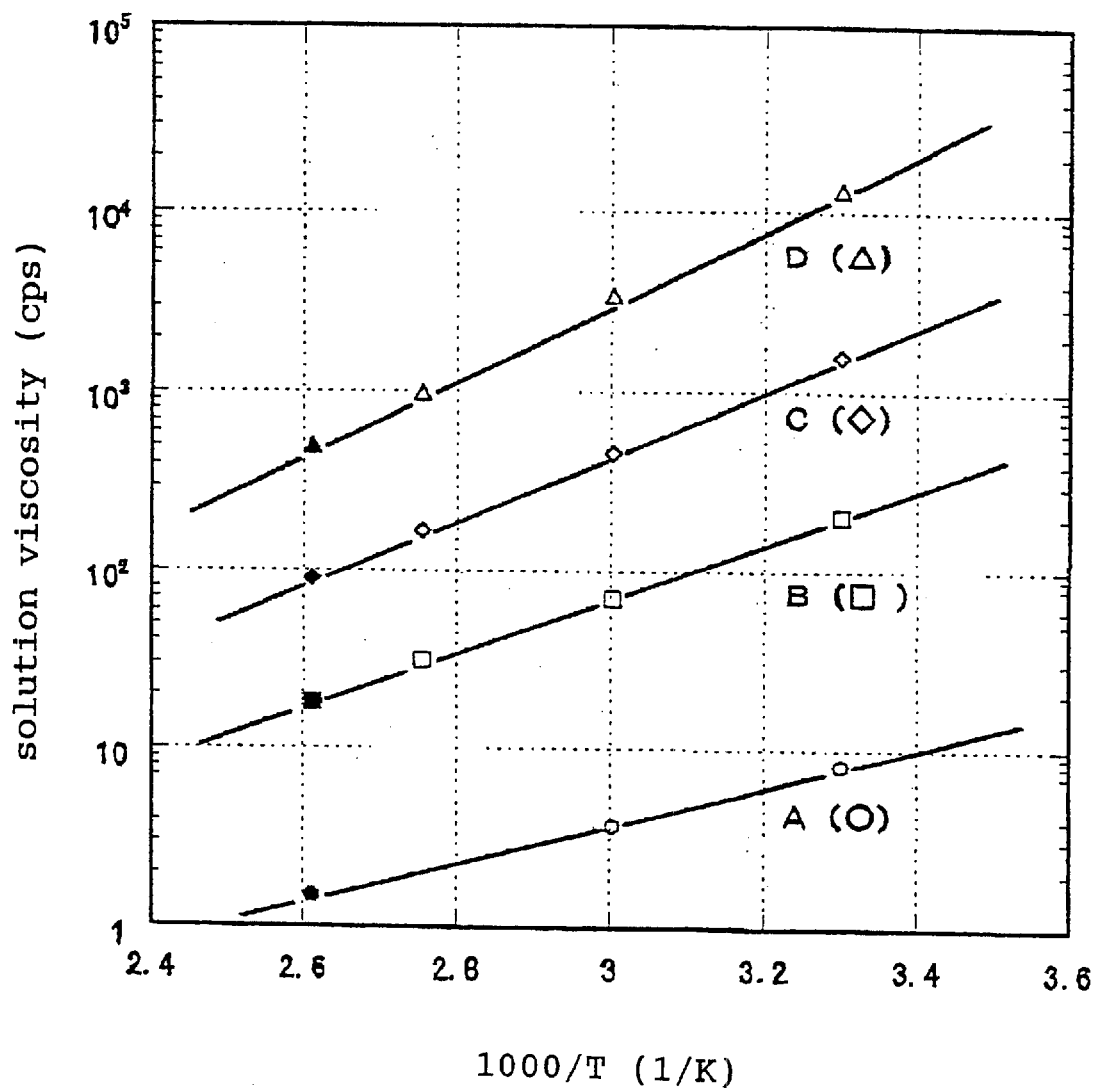
FIG. 1 shows the relationship between the solution viscosity and temperature T (K) of a hydrogenated α-olefin-dicyclopentadiene copolymer dissolved in toluene obtained in Reference Example 1 when the solution concentration is used as a parameter.

First of all, the first production process of the present invention will be described in detail hereinafter.
(Step (1))

The step (1) in the present invention comprises addition-copolymerization of an α-olefin having 2 or more carbon atoms and dicyclopentadiene in a hydrocarbon-based solvent in the presence of a polymerization catalyst, and then removing the polymerization catalyst as required, to obtain an α-olefin-dicyclopentadiene copolymer containing unreacted dicyclopentadiene.

Illustrative examples of the α-olefin having 2 or more carbon atoms include α-olefins having 2 to 20 carbon atoms such as ethylene, propylene, 1-butene, 1-pentene, 1-hexene, 4-methyl-1-pentene, 1-heptene, 1-octene and 1-decene. Of these, ethylene and propylene are preferred, and ethylene is particularly preferred from the viewpoint of polymerization activity and the molecular weight of the polymer. They may be used alone or in combination of two or more.

Dicyclopentadiene is used as a cyclic olefin in the present invention. In consideration of the physical properties of the polymer, a cyclic olefin represented by the following general formulas (I) and/or (II) may further be added to dicyclopentadiene as required, preferably in an amount of 10 mol % or less, more preferably 5 mol % or less.

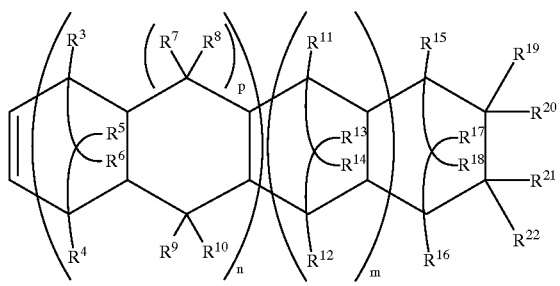

(I)

[In the formula (I), n is 0 or 1. m is 0 or a positive integer, preferably 0 or 1. P is 0 or 1. $R^3$ to $R^{22}$ are the same or different and are each a hydrogen atom, halogen atom, aromatic hydrocarbon group having 6 to 10 carbon atoms, or saturated or unsaturated aliphatic hydrocarbon group having 1 to 12 carbon atoms, $R^{19}$ and $R^{20}$, or $R^{21}$ and $R^{22}$ may form an alkylidene group, and one of $R^{19}$ and $R^{20}$ and one of $R^{21}$ or $R^{22}$ may form a ring, which may have a double bond or an aromatic ring.]

(II)

[In the formula (II), q is an integer of 2 to 8.]

The following compounds are examples of the cyclic olefin represented by the above formula (I): bicyclo[2.2.1]hept-2-ene derivatives such as bicyclo[2.2.1]hept-2-ene (norbornene), 1-methylbicyclo[2.2.1]hept-2-ene, 6-methylbicyclo[2.2.1]hept-2-ene, 6-ethylbicyclo[2.2.1]hept-2-ene, 6-n-propylbicyclo[2.2.1]hept-2-ene, 6-isopropylbicyclo[2.2.1]hept-2-ene, 6-n-butylbicyclo[2.2.1]hept-2-ene, 6-isobutylbicyclo[2.2.1]hept-2-ene, 6-ethylidenebicyclo[2.2.1]hept-2-ene, 6-propylidenebicyclo[2.2.1]hept-2-ene, 6-isopropylidenebicyclo[2.2.1]hept-2-ene and 7-methylbicyclo[2.2.1]hept-2-ene; tricyclo[4.3.0.1$^{2,5}$]-3-decene derivatives such as tricyclo[4.3.0.1$^{2,5}$]-3-decene, 2-methyltricyclo[4.3.0.1$^{2,5}$]-3-decene, 5-methyltricyclo[4.3.0.1$^{2,5}$]-3-decene and 10-methyltricyclo[4.3.0.1$^{2,5}$]-3-decene; tricyclo[4.4.0.1$^{2,5}$]-3-undecene derivatives such as tricyclo[4.4.0.1$^{2,5}$]-3-undecene, 2-methyltricyclo[4.4.0.1$^{2,5}$]-3-undecene, 5-methyltricyclo[4.4.0.1$^{2,5}$]-3-undecene and 11-methyltricyclo[4.4.0.1$^{2,5}$]-3-undecene; tetracyclo[4.4.0.1$^{2,5}$.1$^{7,10}$]-3-dodecene derivatives such as tetracyclo[4.4.0.1$^{2,5}$.1$^{7,10}$]-3-dodecene, 8-methyltetracyclo[4.4.0.1$^{2,5}$.1$^{7,10}$]-3-dodecene, 8-ethyltetracyclo[4.4.0.1$^{2,5}$.1$^{7,10}$]-3-dodecene 8-n-propyltetracyclo[4.4.1$^{2,5}$1$^{7,10}$-]3-dodecene, 8-isopropyltetracyclo[4.4.0.1$^{2,5}$.1$^{7,10}$]-3-dodecene, 8-n-butyltetracyclo[4.4.0.1$^{2,5}$.1$^{7,10}$]-3-dodecene, 8-isobutyltetracyclo[4.4.0.1$^{2,5}$.1$^{7,10}$]-3-dodecene, 8-ethylidenetetracyclo[4.4.0.1$^{2,5}$.1$^{7,10}$]-3-dodecene, 8-n-propylidenetetracyclo[4.4.0.1$^{2,5}$.1$^{7,10}$]-3-dodecene and 8-isopropylidenetetracyclo[4.4.0.1$^{2,5}$.1$^{7,10}$]-3-dodecene; pentacyclo[6.5.1.1$^{3,6}$.0$^{2,7}$.0$^{9,13}$]-4-pentadecene and pentacyclo[6.5.1.1$^{3,6}$.0$^{2,7}$.0$^{9,13}$]-4,10-pentadecadiene.

Illustrative examples of the compound represented by the formula (II) are as follows: cyclopropene, cyclobutene, cyclopentene, cyclohexene, cycloheptene and cyclooctene.

The hydrocarbon solvent used in the present invention is not particularly limited as long as it dissolves the polymerization catalyst, the hydrogenation homogeneous catalyst and the produced copolymer. Preferred examples of the hydrocarbon-based solvent include aliphatic hydrocarbons such as butane, isobutane, pentane, hexane, 2-methylpentane, 2,2-dimethylbutane, 2,3-dimethylbutane, heptane, octane, 2,2,3-trimethylpentane, 2,2,4-trimethylpentane, nonane, 2,2,5-trimethylhexane and decane; alicyclic hydrocarbons such as cyclopentane, methylcyclopentane, ethylcyclopentane, cyclohexane, methylcyclohexane, ethylcyclohexane, propylcyclohexane, butylcyclohexane, pentylcyclohexane, hexylcyclohexane, dicyclohexyl, heptylcyclohexane, octylcyclohexane, methylisopropylcyclohexane, dimethylcyclohexane, diethylcyclohexane, dipropylcyclohexane, dibutylcyclohexane, dipentylcyclohexane, trimethylcyclohexane, triethylcyclohexane, tetramethylcyclohexane, cyclooctane and decahydronaphthalene; and aromatic hydrocarbons such as benzene, toluene, ethylbenzene, propylbenzene, butylbenzene, pentylbenzene, hexylbenzene, heptylbenzene, octylbenzene, biphenyl, cyclohexylbenzene, cumene, xylene, diethylbenzene, dipropylbenzene, dibutylbenzene, dipentylbenzene, mesitylene, triethylbenzene, tetramethylbenzene, naphthalene, methylnaphthalene, ethylnaphthalene, dimethylnaphthalene and tetrahydronaphthalene. They may be used alone or in combination of two or more. Of these, aromatic hydrocarbons and alicyclic hydrocarbons are preferred because of their high solubility for catalysts and copolymers. When the hydrocarbon-based solvent is hydrogenated together with the polymer in the subsequent step (2), alicyclic hydrocarbons are preferred.

The polymerization catalyst used in the present invention is not particularly limited as long as it can copolymerize an α-olefin and dicyclopentadiene. It is preferably a metallocene-based catalyst or a Ziegler-based catalyst.

The metallocene-based catalyst comprises a metallocene and a co-catalyst. The metallocene is preferably represented by the following general formula (III).

(III)

[In the above formula (III), M is a metal selected from the IV group metals, $R^{26}$ and $R^{27}$ are the same or different and are each a hydrogen atom, halogen atom, saturated or unsaturated hydrocarbon group having 1 to 12 carbon atoms, alkoxy group having 1 to 12 carbon atoms, or aryloxy group having 6 to 12 carbon atoms, $R^{24}$ and $R^{25}$ are the same or different and are each a monocyclic or polycyclic hydrocarbon group which can form a sandwich structure with a center metal M, and $R^{23}$ is a bridge for connecting an $R^{24}$ group and an $R^{25}$ group and selected from

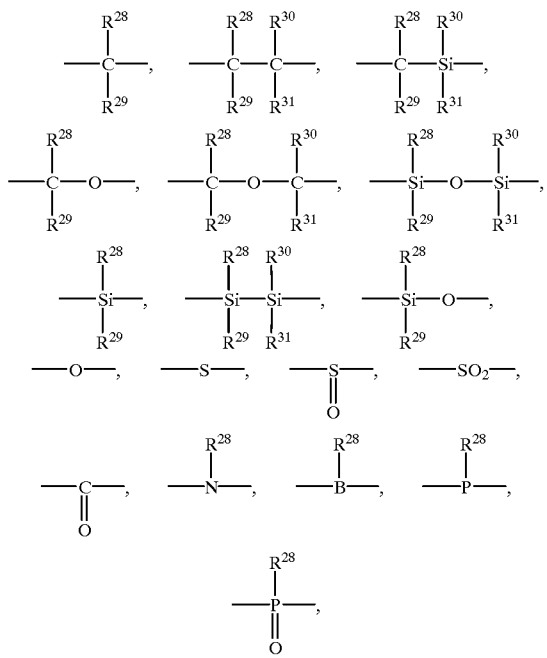

($R^{28}$ to $R^{31}$ are the same or different and are each a hydrogen atom, halogen atom, saturated or unsaturated hydrocarbon group having 1 to 12 carbon atoms, alkoxy group having 1 to 12 carbon atoms or aryloxy group having 6 to 12 carbon atoms, or $R^{28}$ and $R^{29}$ or $R^{30}$ and $R^{31}$ may form a ring).]

In the metallocene represented by the above formula (III), the center metal M is the most preferably zirconium from the viewpoint of catalytic activity. $R^{26}$ and $R^{27}$ may be the same or different but they are preferably an alkyl group having 1 to 6 carbon atoms or a halogen atom (especially chlorine atom). $R^{24}$ and $R^{25}$ are each a cyclic hydrocarbon group, as preferably exemplified by a cyclopentadienyl group, indenyl group or fluorenyl group. They may be substituted by a hydrogen atom, alkyl group such as a methyl group, ethyl group, isopropyl group or tert-butyl group, phenyl group or benzyl group. $R^{28}$ to $R^{31}$ are preferably a hydrogen atom, alkyl group having 1 to 6 carbon atoms or phenyl group. $R^{23}$ is preferably a lower alkylene group such as a methylene group, ethylene group or propylene group, alkylidene group such as isopropylidene, substituted alkylene group such as diphenylmethylene, silylene group, or substituted silylene group such as dimethylsilylene or diphenylsilylene.

The following compounds can be enumerated as examples of the metallocene containing zirconium as the center metal M: dimethylsilylene-bis(1-indenyl)zirconium dichloride, diphenylsilylene-bis(1-indenyl)zirconium dichloride, dibenzylsilylene-bis(1-indenyl)zirconium dichloride, methylene-bis(1-indenyl)zirconium dichloride, ethylene-bis(1-indenyl)zirconium dichloride, diphenylmethylene-bis(1-indenyl)zirconium dichloride, isopropylidene-bis(1-indenyl)zirconium dichloride, phenylmethylsilylene-bis(1-indenyl)zirconium dichloride, dimethylsilylene-bis[1-(2,4,7-trimethyl)indenyl]zirconium dichloride, diphenylsilylene-bis[1-(2,4,7-trimethyl)indenyl zirconium dichloride, dibenzylsilylene-bis[1-(2,4,7-trimethyl)indenyl]zirconium dichloride, methylene-bis[1-(2,4,7-trimethyl)indenyl]zirconium dichloride, ethylene-bis[1-(2,4,7-trimethyl)indenyl]zirconium dichloride, diphenylmethylene-bisl-(2,4,7-trimethyl)indenyl]zirconium dichloride, isopropylidene-bis[1-(2,4,7-trimethyl)indenyl] zirconium dichloride, phenylmethylsilylene-bis[1-(2,4,7-trimethyl)indenyl]zirconium dichloride, dimethylsilylene-bis[1-(2,4-dimethyl)indenyl]zirconium dichloride, diphenylsilylene-bis[1-(2,4-dimethyl)indenyl]zirconium dichloride, dibenzylsilylene-bis[1-(2,4-dimethyl)indenyl] zirconium dichloride, methylene-bis[1-(2,4-dimethyl) indenyl]zirconium dichloride, ethylene-bis[1-(2,4-dimethyl) indenyl]zirconium dichloride, diphenylmethylene-bis[1-(2, 4-dimethyl)indenyl]zirconium dichloride, isopropylidene-bis[1-(2,4-dimethyl)indenyl]zirconium dichloride, phenylmethylsilylene-bis[1-(2,4-dimethyl)indenyl] zirconium dichloride, dimethylsilylene-bis[1-(4,5,6,7-tetrahydro)indenyl]zirconium dichloride, diphenylsilylene-bis[1-(4,5,6,7-tetrahydro)indenyl]zirconium dichloride, dibenzylsilylene-bis[1-(4,5,6,7-tetrahydro)indenyl] zirconium dichloride, methylene-bis[1-(4,5,6,7-tetrahydro) indenyl]zirconium dichloride, ethylene-bis[1-(4,5,6,7-tetrahydro)indenyl]zirconium dichloride, diphenylmethylene-bis[1-(4,5,6,7-tetrahydro)indenyl] zirconium dichloride, isopropylidene-bis[1-(4,5,6,7-tetrahydro)indenyl]zirconium dichloride, phenylmethylsilylene-bis[1-(4,5,6,7-tetrahydro)indenyl] zirconium dichloride, dimethylsilylene-(9-fluorenyl) (cyclopentadienyl)zirconium dichloride, diphenylsilylene-(9-fluorenyl)(cyclopentadienyl)zirconium dichloride, dibenzylsilylene-(9-fluorenyl)(cyclopentadienyl)zirconium dichloride, methylene-(9-fluorenyl)(cyclopentadienyl) zirconium dichloride, ethylene-(9-fluorenyl) (cyclopentadienyl)zirconium dichloride, diphenylmethylene-(9-fluorenyl)(cyclopentadienyl) zirconium dichloride, isopropylidene-(9-fluorenyl) (cyclopentadienyl)zirconium dichloride, phenylmethylsilylene-(9-fluorenyl)(cyclopentadienyl) zirconium dichloride, dimethylsilylene-(9-fluorenyl)[1-(3- tert-butyl)cyclopentadienyl]zirconium dichloride, diphenylsilylene-(9-fluorenyl)[1-(3-tert-butyl) cyclopentadienyl]zirconium dichloride, dibenzylsilylene-(9-fluorenyl)[1-(3-tert-butyl)cyclopentadienyl]zirconium dichloride, methylene-(9-fluorenyl)[1-(3-tert-butyl) cyclopentadienyl]zirconium dichloride, ethylene-(9-fluorenyl)[1-(3-tert-butyl)cyclopentadienyl]zirconium dichloride, diphenylmethylene-(9-fluorenyl)[1-(3-tert-butyl)cyclopentadienyl]zirconium dichloride, isopropylidene-(9-fluorenyl)[1-(3-tert-butyl) cyclopentadienyl]zirconium dichloride, phenylmethylsilylene-(9-fluorenyl)[1-(3-tert-butyl) cyclopentadienyl]zirconium dichloride, dimethylsilylene-(9-fluorenyl)[1-(3-methyl)cyclopentadienyl]zirconium dichloride, diphenylsilylene-(9-fluorenyl)[1-(3-methyl) cyclopentadienyl]zirconium dichloride, dibenzylsilylene-(9-fluorenyl)[1-(3-methyl)cyclopentadienyl]zirconium dichloride, methylene-(9-fluorenyl)[1-(3-methyl) cyclopentadienyl]zirconium dichloride, ethylene-(9-fluorenyl)[1-(3-methyl) cyclopentadienyl]zirconium dichloride, diphenylmethylene-(9-fluorenyl)[1-(3-methyl) cyclopentadienyl]zirconium dichloride, isopropylidene-(9-fluorenyl)[1-(3-methyl)cyclopentadienyl]zirconium dichloride, phenylmethylsilylene-(9-fluorenyl)[1-(3-methyl)cyclopentadienyl]zirconium dichloride, dimethylsilylene-[9-(2,7-di-tert-butyl)fluorenyl] (cyclopentadienyl)zirconium dichloride, diphenylsilylene-[9-(2,7-di-tert-butyl)fluorenyl](cyclopentadienyl)zirconium dichloride, dibenzylsilylene-[9-(2,7-di-tert-butyl)fluorenyl] (cyclopentadienyl)zirconium dichloride, methylene-[9-(2,7-di-tert-butyl)fluorenyl](cyclopentadienyl)zirconium dichloride, ethylene-[9-(2,7-di-tert-butyl)fluorenyl] (cyclopentadienyl)zirconium dichloride, diphenylmethylene-[9-(2,7-di-tert-butyl)fluorenyl] (cyclopentadienyl)zirconium dichloride, isopropylidene-[9-(2,7-di-tert-butyl)fluorenyl](cyclopentadienyl)zirconium dichloride, phenylmethylsilylene-[9-(2,7-di-tert-butyl) fluorenyl](cyclopentadienyl)zirconium dichloride, dimethylsilylene-(1-indenyl)(cyclopentadienyl)zirconium dichloride, diphenylsilylene-(1-indenyl)(cyclopentadienyl) zirconium dichloride, diphenzylsilylene-(1-indenyl) (cyclopentadienyl)zirconium dichloride, methylene-(1-indenyl)(cyclopentadienyl)zirconium dichloride, ethylene-(1-indenyl)(cyclopentadienyl)zirconium dichloride, diphenylmethylene-(1-indenyl)(cyclopentadienyl) zirconium dichloride, isopropylidene-(1-indenyl) (cyclopentadienyl)zirconium dichloride, phenylmethylsilylene-(1-indenyl)(cyclopentadienyl) zirconium dichloride, dimethylsilylene-bis (cyclopentadienyl)zirconium dichloride, diphenylsilylene-bis(cyclopentadienyl)zirconium dichloride, dibenzylsilylene-bis(cyclopentadienyl)zirconium dichloride, methylene-bis(cyclopentadienyl)zirconium dichloride, ethylene-bis(cyclopentadienyl)zirconium dichloride, diphenylmethylene-bis(cyclopentadienyl) zirconium dichloride, isopropylidene-bis(cyclopentadienyl) zirconium dichloride, phenylmethylsilylene-bis (cyclopentadienyl)zirconium dichloride, isopropylidene-(1-indenyl)[1-(3-tert-butyl)cyclopentadienyl]zirconium dichloride, isopropylidene-(9-fluorenyl)[1-(3-isopropyl) cyclopentadienyl]zirconium dichloride, isopropylidene-[1-(2,4,7-trimethyl)indenyl](cyclopentadienyl)zirconium dichloride, ethylene-(cyclopentadienyl)[1-(3-tert-butyl) cyclopentadienyl]zirconium dichloride, ethylene-(cyclopentadienyl)[1-(3-phenyl)cyclopentadienyl] zirconium dichloride, isopropylidene-(9-fluorenyl) (cyclopentadienyl)zirconium dibromide, dimethylsilylene-bis(1-indenyl)zirconium dibromide and ethylene-bis(1-indenyl)methyl zirconium monochloride.

In the present invention, particularly preferred metallocenes are isopropylidene-(9-fluorenyl)(cyclopentadienyl) zirconium dichloride, diphenylmethylene-(9-fluorenyl) (cyclopentadienyl)zirconium dichloride, isopropylidene-(9-fluorenyl)[1-(3-methyl)-cyclopentadienyl]zirconium dichloride, isopropylidene-(9-fluorenyl)[1-(3-tert-butyl) cyclopentadienyl]zirconium dichloride, isopropylidene-(1-indenyl)(cyclopentadienyl)zirconium dichloride, dimethylsilylene-bis(1-indenyl)zirconium dichloride, ethylene-bis(1-indenyl)zirconium dichloride and isopropylidene-bis(1-indenyl)zirconium dichloride.

The concentration of the metallocene may be determined according to its polymerization activity. The metallocene is used in an amount of $10^{-6}$ to $10^{-2}$ mol, preferably $10^{-5}$ to $10^{-3}$ mol, per mol of the dicyclopentadiene added to a polymerization reaction system.

The co-catalyst is preferably an aluminoxane, which is an organic aluminum oxy compound. The aluminoxane can be represented by the general formula (IV) when it has a linear structure and by the general formula (V) when it has a cyclic structure.

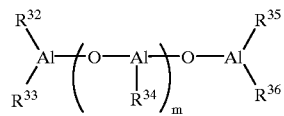

(IV)

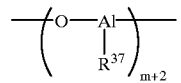

(V)

[In the formulas (IV) and (V), $R^{32}$ to $R^{37}$ are the same or different and are each an alkyl group having 1 to 6 carbon atoms such as a methyl group, ethyl group, propyl group or butyl group, phenyl group or benzyl group. They are preferably a methyl group or ethyl group and particularly preferably a methyl group. m is an integer of 2 or more, preferably 5 to 100.]

However, the accurate structure of the aluminoxane is unknown.

The aluminoxane can be produced by conventionally known methods, one of which comprises reacting a compound containing absorbed water or a salt containing crystal water (such as copper sulfate hydrate) with an organic aluminum compound such as trialkyl aluminum in an inert solvent (such as toluene). The aluminoxane may contain a small amount of an organic aluminum compound derived from the above production methods.

The aluminoxane serves to alkylate the metallocene and to make it cationic, whereby polymerization activity is obtained. Since the activation of the metallocene is carried out in a solution, the metallocene is preferably dissolved in an aluminoxane solution. A solvent used for the activation is preferably an aliphatic hydrocarbon, alicyclic hydrocarbon or aromatic hydrocarbon. Of these, a solvent identical to one used for the polymerization reaction is the most preferred. The activation of the metallocene with the aluminoxane is carried out, normally prior to the polymerization reaction and the time required for the activation is 1 minute to 10 hours, preferably 3 minutes to 1 hour. The activation is carried out at a temperature of −40 to 110° C., preferably 0 to 80° C.

Although the concentration of the aluminoxane solution is not particularly limited within the range from 1 wt % to the limit of dissolution, it is preferably 5 to 30 wt %. The amount of the aluminoxane is 30 to 20,000 mols, preferably 100 to 5,000 mols, per mol of the metallocene. If the amount of the aluminoxane is too small, sufficiently high polymerization activity cannot be obtained. On the other hand, when the amount is too large, it is uneconomical because a large amount of an expensive aluminoxane is used, even though high polymerization activity can be obtained, and furthermore, purification after polymerization becomes difficult disadvantageously.

A preferred co-catalyst other than aluminoxanes includes an ionic boron compound and an alkylating agent.

Illustrative examples of the ionic boron compound are compounds represented by the following general formulas (VI) to (IX).

$$[R^{38}_3C]^+[BR^{39}_4]^- \quad (VI)$$

$$[R^{38}_xNH_{4-x}]^+[BR^{39}_4]^- \quad (VII)$$

$$[R^{38}_xPH_{4-x}]^+[BR^{39}_4]^- \quad (VIII)$$

$$Li^+[BR^{39}_4]^- \quad (IX)$$

[In the above formulas (VI) to (IX), $R^{38}$s are the same or different and are each an aliphatic hydrocarbon group having 1 to 8 carbon atoms or aromatic hydrocarbon group having 6 to 18 carbon atoms. $R^{39}$s are the same or different and are each an aromatic hydrocarbon group having 6 to 18 carbon atoms. X is 1, 2, 3 or 4.]

In the ionic boron compounds represented by the above formulas (VI) to (IX), $R^{38}$s are each an alkyl group such as a methyl group, ethyl group, propyl group or butyl group, or an aryl group such as a phenyl group. $R^{39}$s are preferably the same and are each a fluorinated or partially fluorinated aromatic hydrocarbon group, particularly preferably a pentafluorophenyl group. X is preferably 3. The ionic boron compounds include, for example, N,N-dimethylanilinium-tetrakis(pentafluorophenyl)borate, trityl-tetrakis(pentafluorophenyl)borate and lithium-tetrakis(pentafluorophenyl)borate.

The alkylating agent is preferably an alkyl lithium compound or alkyl aluminum compound, as exemplified by methyl lithium, butyl lithium, trimethyl aluminum, triethyl aluminum, triisobutyl aluminum and tri-n-butyl aluminum.

The ionic boron compound serves to make the metallocene cationic and the alkylating agent serves to alkylate the metallocene. Polymerization activity can be obtained by combining these.

As for the ratio of the ionic boron compound to the metallocene, the ionic boron compound is used in an amount of 0.5 to 10 mols, preferably 0.8 to 3 mols, more preferably 0.9 to 2 mols, per mol of the metallocene. The alkylating agent is used in an amount of 2 to 500 mols per mol of the metallocene. The required amount of the ionic boron co pound based on the metallocene is much smaller and catalytic activity tends to be higher than when an aluminoxane is used as a co-catalyst. Therefore, the amounts of the metallocene and the co-catalyst can be reduced, therebymaking it possible to obtain a large economical advantage and a large advantage in purification after polymerization.

In general, these co-catalysts are used directly or prepared as a solution of a hydrocarbon solvent as described above. They can also be used as being supported on a support. The support is preferably an inorganic compound such as silica gel or alumina, or a fine polyolefin powder such as polyethylene or polypropylene.

The other preferred polymerization catalyst used in the present invention is a Ziegler-based catalyst. The Ziegler-based catalyst used in the present invention is a catalyst comprising a vanadium compound and an organic aluminum compound. The vanadium compound is selected from the vanadium compounds represented by the following general formulas (X) and (XI) and electron donor adducts thereof.

$$VO(OR^{40})_aR^{41}_b \quad (X)$$

$$V(OR^{40})_cR^{41}_d \quad (XI)$$

[In the above formulas (X) and (XI), $R^{40}$s are the same or different and are each an aliphatic hydrocarbon group having 1 to 8 carbon atoms or aromatic hydrocarbon group having 6 to 18 carbon atoms. $R^{41}$s are the same or different and are each a halogen atom, aliphatic hydrocarbon group having 1 to 8 carbon atoms or aromatic hydrocarbon group having 6 to 18 carbon atoms. a, b, c and d are integers which satisfy $0 \leq a \leq 3$, $0 \leq b \leq 3$, $2 \leq a+b \leq 3$, $0 \leq c \leq 4$, $0 \leq d \leq 4$ and $3 \leq c+d \leq 4$.]

Illustrative examples of the vanadium compound include vanadium(oxy)trichloride, vanadium(oxy)(ethoxy)dichloride, vanadium(oxy)(propoxy)dichloride, vanadium (oxy) (isopropoxy)dichloride, vanadium(oxy)(butoxy)dichloride, vanadium(oxy)(isobutoxy)dichloride, vanadium(oxy)(diethoxy)chloride, vanadium(oxy)(diisopropoxy)chloride, vanadium(oxy)(dibutoxy)chloride, vanadium(oxy)(diisobutoxy)chloride, vanadium(oxy)triethoxide, vanadium(oxy)tripropoxide, vanadium(oxy)truisopropoxide, vanadium(oxy)tributoxide, vanadium(oxy)triisobutoxide, vanadium trichloride, vanadium tribromide and vanadium tetrachloride. Electron donors used to prepare the electron donor adducts of the vanadium compounds include oxygen-containing electron donors such as alcohols, phenols, ketones, aldehydes, carboxylic acids, acid esters, acid amides, acid anhydrides, ethers and alkoxysilanes, and nitrogen-containing electron donors such as amines, nitrites and isocyanates.

The content of the vanadium compound or electron donor adduct thereof may be determined according to its polymerization activity. It is generally $10^{-6}$ to $10^{-2}$ mol, preferably $10^{-5}$ to $10^{-3}$ mol, per mol of the dicyclopentadiene added to the polymerization reaction system.

The organic aluminum compound contained in the Ziegler-based catalyst is a compound having at least one aluminum-carbon bond in the molecule. Illustrative examples of the organic aluminum compound include trialkyl aluminum compounds such as triethyl aluminum and truisobutyl aluminum; organic aluminum alkoxide compounds such as diethyl aluminum ethoxide, diisobutyl aluminum butoxide and ethyl aluminum sesquiethoxide; organic aluminum oxy compounds such as methyl aluminoxane and ethyl aluminoxane;

and organic aluminum halide compounds such as diethyl aluminum chloride, diisobutyl aluminum chloride, ethyl aluminum sesquichloride, butyl aluminum sesquichloride, ethyl aluminum dichloride and isobutyl aluminum dichloride. Of these, organic aluminum halide compounds are particularly preferred.

The organic aluminum compound serves to alkylate a vanadium compound or an electron donor adduct thereof, whereby polymerization activity is obtained. A solvent used for the activation is preferably an aliphatic hydrocarbon, alicyclic hydrocarbon or aromatic hydrocarbon. Of these, a solvent identical to one used for the polymerization reaction is the most preferred.

As for the ratio of the organic aluminum compound to the vanadium compound or electron donor adduct thereof, the organic aluminum compound is used in an amount of 2 to 500 mols, preferably 2 to 50 mols, more preferably 3 to 30 mols, per mol of the vanadium compound or electron donor adduct thereof. When the amount of the organic aluminum compound is too small, high activity cannot be obtained, while when the amount is too large, the obtained polymer may be gelled disadvantageously.

Addition copolymerization is carried out at a temperature of −20 to 150° C., preferably −10 to 120° C., more preferably 0 to 100° C. When the polymerization temperature is too low, a polymerization reaction does not proceed smoothly, while when the polymerization temperature is too high, the catalyst is deactivated disadvantageously. The polymerization temperature is preferably as constant as possible to obtain a homogeneous polymer.

In order to obtain a copolymer having high chemical homogeneity, the ratio of the α-olefin to dicyclopentadiene is preferably maintained at least at a predetermined value. As a result, the copolymer solution inevitably contains unreacted dicyclopentadiene. Reaction conditions are preferably controlled in such a manner to ensure that the residual amount of the unreacted dicyclopentadiene is 50% or less, preferably 30% or less, more preferably 20% or less of the total amount of the added dicyclopentadiene.

The copolymer solution produced by the polymerization reaction is subsequently subjected to a hydrogenation reaction in the presence of a hydrogenation reaction catalyst. The polymerization catalyst contained in the copolymer solution may hinder the activity of the hydrogenation reaction catalyst. In that case, it is preferred to remove the polymerization catalyst from the copolymer solution as required before the hydrogenation reaction.

The method for removing the polymerization catalyst, though not particularly limited, is preferably a method which comprises adding an active hydrogen-containing compound to the copolymer solution to precipitate a catalyst component and removing it by filtration, a method which comprises washing the copolymer solution with water and extracting a catalyst component in a water phase, or the like. Specific examples of the active hydrogen-containing compound include water; alcohols such as methanol, ethanol and 1-butanol; phenols such as phenol, cresol, xylenol and catechol; carboxylic acids such as formic acid, acetic acid and lactic acid; and amines such as ammonia, ethylamine, n-propylamine, ethylenediamine and monoethanolamine.

The solution from which the catalyst has been removed may be purified by bringing it into contact with an adsorbent. The adsorbent is preferably activated clay, silica gel, alumina, silica alumina or zeolite.

(Step (2))

The α-olefin-dicyclopentadiene copolymer solution produced in the step (1) is subjected to a hydrogenation reaction in the presence of a hydrogenation catalyst in the step (2) to hydrogenate unsaturated double bonds contained in the copolymer, whereby a hydrogenated α-olefin-dicyclopentadiene copolymer is produced.

The hydrogenation catalyst used in the present invention is not particularly limited as long as it is a catalyst generally used for the hydrogenation reaction of an olefin compound. The hydrogenation catalyst is preferably a catalyst consisting of a transition metal compound and an alkylating agent, a homogenous noble metal catalyst, or a heterogeneous catalyst.

The transition metal compound contained In the catalyst consisting of a transition metal compound and an alkylating agent is a halide, acetylacetonato complex, carboxylate complex, naphthate complex, trifluoroacetate complex, stearate complex or the like of a transition metal such as titanium, vanadium, chromium, manganese, iron, ruthenium, cobalt, rhodium, nickel or palladium. Specific examples of the transition metal compound include bis(cyclopentadienyl)titanium dichloride, triethyl vanadate, tris(acetylacetonato)chromium, tris(acetylacetonato)manganese, cobalt acetate, tris(acetylacetonato)cobalt, cobalt octenate and bis(acetylacetonato)nickel. The alkylating agent is, for example, lithium, magnesium, aluminum or zinc compound. Specific examples of the alkylating agent include butyl lithium, dimethyl magnesium, triethyl aluminum, truisobutyl aluminum, methyl aluminoxane and diethylzinc. Of these, a combination of a titanium, cobalt or nickel compound and an alkyl aluminum compound or alkyl lithium compound is preferred, and a combination of bis(cyclopentadienyl)titanium dichloride and butyl lithium and a combination of tris(acetylacetonato)cobalt or bis(acetylacetonato)nickel and an alkyl aluminum compound such as triethyl aluminum, triisobutyl aluminum or methyl aluminoxane are particularly preferred from the viewpoint of catalytic activity.

As for the quantitative relationship between the transition metal compound and the alkylating agent, the proportion of the metal component of the alkyl metal compound is 1 to 50 mols, preferably 10 mols or less, per mol of the metal of the transition metal compound.

The transition metal compound is converted into an alkylated transition metal compound by the alkylating agent to have a hydrogenation catalytic activity.

The homogeneous noble metal catalyst is a catalyst which does not necessarily require an alkylating agent, as exemplified by carbonyl(chloro)(hydride)tris(triphenylphosphine)ruthenium, di(hydride)(carbonyl)tris(triphenylphosphine)ruthenium, di(hydride)tetrakis(triphenylphosphine)ruthenium, tetra(hydride)tris(triphenylphosphine)ruthenium, (chloro)tris(triphenylphosphine)rhodium and hydride(carbonyl)tris(triphenylphosphine)rhodium.

The heterogeneous catalyst is a solid catalyst which has a metal supported on a support and which is insoluble in a solvent. Illustrative examples of the metal include iron, ruthenium, cobalt, rhodium, iridium, nickel, palladium and platinum. Illustrative examples of the support include carbon, silica, alumina, silica aluminum and diatomaceous earth.

The content of the transition metal compound of the hydrogenation catalyst may be determined according to its polymerization activity. It is generally $10^{-6}$ to $10^{-1}$ mol, preferably $10^{-5}$ to $10^{-2}$ mol, per mol of the double bonds between carbons contained in the polymer.

The temperature, hydrogen pressure and reaction time of the hydrogenation reaction of the copolymer may be determined according to the types of monomers used for addition polymerization and the type of the hydrogenation catalyst. The temperature is generally 0 to 200° C., preferably 20 to 180° C., the hydrogen pressure is 0.1 to 200 kgf/cm$^2$, preferably 1 to 150 kgf/cm$^2$, and the reaction time is 0.1 to 20 hours. At a low temperature and a low hydrogen pressure, the hydrogenation reaction does not proceed smoothly disadvantageously. At a high temperature and a high hydrogen pressure, on the other hand, the catalyst is deactivated and a great load is imposed on equipment disadvantageously.

The degree of hydrogenation of the copolymer (degree of hydrogenation of the double bonds between carbons) is preferably 99% or more, more preferably 99.5% or more, much more preferably 99.9% or more. When the degree of hydrogenation is lower than 99%, thermal stability becomes insufficient and discoloration easily occurs at the time of melt molding. In the case of a ring-opening polymer having double bonds between carbons in the main chain, the glass transition temperature of the polymer is greatly reduced by hydrogenation. However, in the case of the copolymer of the present invention, the double bonds between carbons are situated in the side chains and, hence, the glass transition temperature does not change very much before and after hydrogenation.

The unreacted dicyclopentadiene monomer contained in the α-olefin-dicyclopentadiene copolymer solution produced in the step (1) is hydrogenated by a hydrogenation catalyst in the step (2) to be converted into tetrahydrodicyclopentadiene. Since a monomer is generally hydrogenated more easily than a polymer, dicyclopentadiene is substantially completely hydrogenated when the degree of hydrogenation of the copolymer is 99% or more. Therefore, the mixture containing the hydrogenated α-olefin-dicyclopentadiene copolymer contains the tetrahydrodicyclopentadiene.

The polymerization catalyst and/or the hydrogenation catalyst can be removed from the mixture containing the hydrogenated α-olefin-dicyclopentadiene copolymer produced in each step after the step (2) or the step (3). A mixture (2) containing a hydrogenated α-olefin-dicyclopentadiene copolymer that substantially contains neither metal derived from the polymerization catalyst nor metal derived from the hydrogenation catalyst can be thereby produced.

When the hydrogenation catalyst is a homogeneous catalyst, the method for removing the catalyst may be the same as the method for removing the polymerization catalyst in the step (1). When the hydrogenation catalyst is a heterogeneous catalyst, the catalyst can be separated from the hydrogenated copolymer solution by filtration. When the hydrogenated copolymer solution from which the heterogeneous catalyst has been removed contains the polymerization catalyst, the polymerization catalyst can be removed by the same method as the method for removing the polymerization catalyst in the step (1).

(Step (3))

In the step (3), tetrahydrodicyclopentadiene is distilled off from the solution mixture (3) containing the hydrogenated α-olefin-dicyclopentadiene copolymer.

In the present invention, at the end of the step (3), at least one of the following operations (i), (ii) and (iii) must be carried out to ensure that a high-boiling hydrocarbon solvent is existent in an amount of at least 10 parts and preferably at least 100 parts by weight based on 100 parts by weight of the hydrogenated α-olefin-dicyclopentadiene copolymer:

(i) use of a high-boiling hydrocarbon solvent as at least part of the hydrocarbon solvent of the step (1), (ii) addition of a high-boiling hydrocarbon solvent in the step (2), and (iii) addition of a high-boiling hydrocarbon solvent in the step (3).

The high-boiling hydrocarbon solvent used herein is a hydrocarbon having a boiling point of 195 to 300° C. and an ignition point of 260° C. or more. When the boiling point is lower than 195° C., tetrahydrodicyclopentadiene cannot be removed efficiently, while the boiling point is higher than 300° C., energy costs for removing high-boiling hydrocarbon solvent become too high. When the ignition point is lower than 260° C., the hydrogenated copolymer cannot be heated until it is molten, disadvantageously. The high-boiling hydrocarbon solvent preferably has a melting point of 50° C. or less because a polymerization reaction can be easily carried out in a solution state. The high-boiling hydrocarbon solvent may be existent in an amount of up to 10,000 parts by weight.

Illustrative examples of the high-boiling hydrocarbon solvent include alkylbenzene compounds such as pentylbenzene, hexylbenzene, heptylbenzene, octylbenzene, cyclohexylbenzene, dibutylbenzene, dipentylbenzene, 1,3,5-triethylbenzene, 1,2,3,4-tetramethylbenzene and 1,2,3,5-tetramethylbenzene; alkylnaphthalene compounds such as 1-methylnaphthalene, 2-methylnaphthalene, 1-ethylnaphthalene, 2-ethylnaphthalene, 1,2-dimethylnaphthalene, 1,4-dimethylnaphthalene and 1,6-dimethylnaphthalene; and tetrahydronaphthalene. Of these, 1-methylnaphthalene, 2-methylnaphthalene and tetrahydronaphthalene are particularly preferred because it is easy to use them industrially. They may be used alone or in combination of two or more.

It is preferable that the high-boiling hydrocarbon solvent be contained in the copolymer solution by carrying out the above operation (i) to eliminate a complicated step in an industrial-scale production, and it is also preferable that the hydrocarbon solvent comprise only the high-boiling hydrocarbon solvent. The high-boiling hydrocarbon solvent has a large influence upon neither a copolymerization reaction between an α-olefin and dicyclopentadiene nor the hydrogenation reaction of the α-olefin-dicyclopentadiene copolymer. However, when the high-boiling hydrocarbon solvent itself is hydrogenated in the hydrogenation reaction step (2), the high-boiling hydrocarbon solvent is preferably added to the solution after the hydrogenation reaction step (2).

The distill-off of tetrahydrodicyclopentadiene is accomplished by heating the hydrogenated copolymer solution at a temperature higher than the boiling point (194° C. at normal pressure) of tetrahydrodicyclopentadiene and lower than the ignition point (235° C.) of tetrahydrodicyclopentadiene. To distill off tetrahydrodicyclopentadiene efficiently, the pressure inside the equipment may be reduced.

The boiling point of tetrahydrodicyclopentadiene is lower than the boiling point of the high-boiling hydrocarbon solvent. Therefore, tetrahydrodicyclopentadiene is distilled off from the hydrogenated copolymer solution prior to the high-boiling hydrocarbon solvent. Since the solution viscosity of the hydrogenated copolymer solution is much lower than that of a system where the high-boiling hydrocarbon solvent is not present, tetrahydrodicyclopentadiene can be distilled off extremely easily and efficiently. Thus, a hydrogenated α-olefin-dicyclopentadiene copolymer is produced as a solution in the high-boiling hydrocarbon solvent containing substantially no tetrahydrodicyclopentadiene.

A description is subsequently given of the second production process of the present invention.

As for what is not described of the second production process herein, it should be understood that what has been described of the first production process can be applied directly or with some modifications which are obvious for those skilled in the art.

The step (1') is identical to the step (1) of the first production process.

In the step (2'), unreacted dicyclopentadiene is distilled off from the α-olefin-dicyclopentadiene copolymer solution containing the unreacted dicyclopentadiene produced in the step (1'), and an α-olefin-dicyclopentadiene copolymer solution containing substantially no unreacted dicyclopentadiene is produced.

Dicyclopentadiene is distilled off prior to the high-boiling hydrocarbon solvent because its boiling point (170° C. at normal pressure) is lower than the boiling point of the high-boiling hydrocarbon solvent. Since the solution viscosity of the α-olefin-dicyclopentadiene copolymer solution is much lower than that of a system where the high-boiling hydrocarbon solvent is not present, the unreacted dicyclopentadiene can be distilled off extremely easily and efficiently.

Dicyclopentadiene undergoes a reverse Diels-Alder reaction and a Diels-Alder reaction and changes into a cyclopentadiene monomer or oligomer when heated to 160° C. The cyclopentadiene oligomer has a high boiling point and it is very difficult to remove it. Therefore, when dicyclopentadiene is to be distilled off, the pressure is preferably set to 600 mmHg or less to prevent the formation of the cyclopentadiene oligomer.

After the step (2'), the step of removing the polymerizationcatalystfromthe α-olefin-dicyclopentadiene copolymer solution can be carried out.

In the subsequent step (3'), a hydrogenation catalyst is added to the α-olefin-dicyclopentadiene copolymer solution produced in the previous step to hydrogenate unsaturated double bonds contained in the copolymer so as to obtain a mixture containing a hydrogenated α-olefin-dicyclopentadiene copolymer. The step (3') is carried out in the same manner as in the above-described step (2). Since the unreacted dicyclopentadiene is substantially removed in the step (2'), tetrahydrodicyclopentadiene is not substantially contained in the mixture containing the hydrogenated α-olefin-dicyclopentadiene copolymer.

After the step (3') is carried out, the polymerization catalyst and/or the hydrogenation catalyst are/is removed from the mixture containing the hydrogenated α-olefin-dicyclopentadiene copolymer to obtain a hydrogenated α-olefin-dicyclopentadiene copolymer solution containing substantially neither metal derived from the polymerization catalyst nor metal derived from the hydrogenation catalyst.

In the second production process, at least one of the following two operations (i') and (ii') is carried out to ensure that a high-boiling hydrocarbon solvent is existent in an amount of at least 10 parts and preferably at least 100 parts by weight based on 100 parts by weight of the α-olefin-dicyclopentadiene copolymer in the step (2'):

(i') use of a high-boiling hydrocarbon solvent as at least part of the hydrocarbon solvent of the step (1'), and (ii') addition of a high-boiling hydrocarbon solvent in the step (2).

It is preferable that the solvent should be further removed from the hydrogenated α-olefin-dicyclopentadiene copolymer obtained by the first production process or the second production process of the present invention to collect the polymer. The solvent is removed by such an apparatus as a heating vacuum concentrator or vented extruder. Since the copolymer contains substantially no tetrahydrodicyclopentadiene, it can be heated to a high temperature higher than 235° C. and lower than the ignition point of the solvent.

Another big feature of the present invention is the simplicity of the solvent removal step. Generally speaking, when a solvent is to be removed from a polymer solution, the temperature of the solution does not go beyond the boiling point of the solvent used until the solvent is substantially completely removed. When the boiling point of the solvent used as low as 100° C., a reduction in solution viscosity and an increase in solubility by heating cannot be expected. As the solvent is removed, the viscosity rises, a concentration distribution of the solution is produced, and the polymer precipitated out on the wall of a vessel as a solid. Under such a circumstance, it is extremely difficult to stir the solution and the efficient removal of the solvent cannot be expected. In contrast to this, when a high-boiling hydrocarbon solvent is used as in the present invention, solution viscosity can be reduced and solubility can be increased by heating the solution to a high temperature. As a result, the polymer can be directly molten from a solution state without going through a solid state, thereby making it possible to remove the solvent very efficiently and substantially completely.

According to the present invention, a hydrogenated α-olefin-dicyclopentadiene copolymer containing substantially no tetrahydrodicyclopentadiene can be molded by the melt molding method of the present invention.

That is, according to the present invention, there is further provided a method for melt-molding a hydrogenated α-olefin-dicyclopentadiene copolymer, which comprises the steps of introducing a hydrogenated α-olefin-dicyclopentadiene copolymer which a reduced viscosity $\eta_{sp}/c$, measured at 30° C. in a toluene solution having a concentration of 0.5 g/dl, of 0.25 to 3 dl/g and which is selected from the group consisting of:

(i) a copolymer comprising recurring units represented by the following formula (A):

(A)

wherein $R^1$ is a hydrogen atom or a saturated aliphatic hydrocarbon group having 1 to 16 carbon atoms, and recurring units represented by the following formula (B):

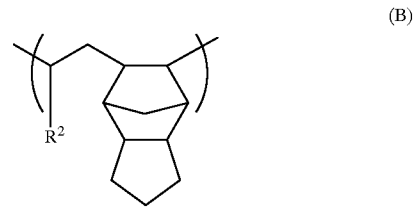

(B)

wherein $R^2$ is a hydrogen atom or a saturated aliphatic hydrocarbon group having 1 to 16 carbon atoms, the molar ratio of the recurring unit (A) to the recurring unit (B) being 0 to 39/100 to 61, and (ii) a copolymer comprising recurring units represented by the above formula (A), recurring units represented by the above formula (B), recurring units represented by the following formula (C):

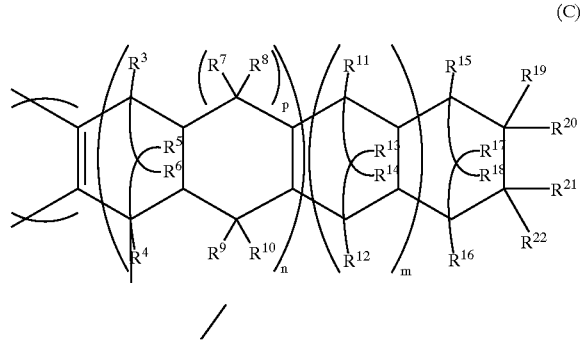

(C)

wherein n is 0 or 1, m is 0 or a positive integer, p is 0 or 1, $R^3$ to $R^{22}$ are the same or different and are each a hydrogen atom, halogen atom, aromatic hydrocarbon group having 6 to 10 carbon atoms, or saturated or unsaturated aliphatic hydrocarbon group having 1 to 12 carbon atoms, either $R^{19}$ and $R^{20}$ or $R^{21}$ and $R^{22}$ may form an alkylidene group, and one of $R^{19}$ or $R^{20}$ and one of $R^{21}$ or $R^{22}$ may form a ring which may have a double bond or aromatic ring, and recurring units represented by the following formula (D):

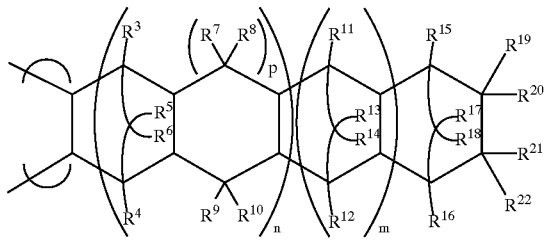

(C)

wherein q is an integer of 2 to 8, the ratio of the total number of mols of the recurring units (A) and (B) to the total number of mols of the recurring units (C) and (D) being 95 to 99.9/5 to 0.1, the molar ratio of the recurring unit (A) to the recurring unit (B) being 0 to 39/100 to 61, and the molar ratio of the recurring unit (D) to the recurring unit (C) being 0 to 95/100 to 5, into a mold maintained at a temperature range from a temperature 100° C. lower than the glass transition temperature of the copolymer to a temperature 10° C. lower than the glass transition temperature of the copolymer and molding it at a molten polymer temperature of 230 to 380° C.

The ratio of the total number of mols of the recurring units (A) and (B) to the total number of mols of the recurring units (C) and (D) is preferably 95 to 98/2 to 5.

The molar ratio of the recurring unit (A) to the recurring unit (B) is preferably 1 to 38/62 to 99.

The molar ratio of the recurring unit (D) to the recurring unit (C) is preferably 0 to 80/20 to 100.

The molecular weight of the above hydrogenated α-olefin-dicyclopentadiene copolymer is determined in consideration of mechanical properties and mechanical strength required for an optical material of interest and resin flow ability required for molding. When it is expressed by the reduced viscosity $\eta_{sp}/c$ measured at 30° C. in a toluene solution having a concentration of 0.5 g/dl, it is in the range of 0.25 to 3 dl/g preferably 0.3 to 2 dl/g, more preferably 0.32 to 1.5 dl/g. When the reduced viscosity is lower than 0.25 dl/g, although its flowability is high and its melting temperature can be thereby reduced, the obtained resin provides a molded product with low mechanical strength and is fragile. When the reduced viscosity is higher than 3 dl/g, although the mechanical properties of its molded product are high, the melt viscosity of the obtained resin becomes too high, thereby making melt molding difficult to conduct.

The molecular weight of the hydrogenated α-olefin dicyclopentadiene copolymer can be controlled by supplying a predetermined amount of a molecular weight control agent such as hydrogen or 1-hexene to a polymerization reaction system, by changing the concentration of a metallocene catalyst, by changing the supply rate of dicyclopentadiene and an α-olefin to the polymerization reaction system, or by other methods.

The glass transition temperature of the hydrogenated α-olefin-dicyclopentadiene copolymer used in the present invention is preferably in the range of 100 to 180° C.

The hydrogenated α-olefin-dicyclopentadiene copolymer used in the present invention preferably has a gel content in the resin of 1 wt % or less, more preferably 0.1 wt % or less. The term "gel" as used herein means a residue remaining on a filter when the resin is dissolved in toluene in an amount of 5 wt % and the resulting solution is filtered with a micro-filter (pore diameter of 1.0 μm). The gel content in the resin can be easily estimated by measuring the weight of the dried residue.

When the gel content is more than 1 wt %, a linear streak called "silver streak" or spotted haze called "fish eye" is inevitably formed even if melt-molding conditions are controlled. In fields which require precision molding such as optical disk substrates, the gel content is preferably 0.1 wt % or less.

Gels formed in the hydrogenated α-olefin-dicyclopentadiene copolymer can be roughly divided into the following three types:

(i) gels formed in the polymerization step and derived from a poly-α-olefin typified by polyethylene formed by polymerizing only an α-olefin component or from a copolymer having a large content of an α-olefin component;

(ii) gels formed by the crosslinking of a double bond portion remaining in the dicyclopentadiene component of the α-olefin-dicyclopentadiene copolymer before hydrogenation; and (iii) gels formed by heating and melting in the solvent removal step or pelletizing step.

To reduce the amount of these gels as much as possible, for example, the following methods can be used.

The gels (i) are formed in the polymerization step. When polymerization is carried out with a relatively large amount of dicyclopentadiene kept over the α-olefin, gels of this type are hardly formed. However, when the metallocene catalyst is deactivated by impurities such as water and oxygen included in the polymerization system, gels of this type may be formed. Therefore, heed must be paid to the purification of the solvent and monomers, the substitution of the inside of the polymerization system with inert gas, and the like.

Heed must also be paid to the method of adding the metallocene catalyst to the polymerization system. The metallocene catalyst comprises a powdery metal complex called "metallocene" and a co-catalyst such as an aluminum compound, exemplified by methyl aluminoxane (MAO) and truisobutyl aluminum, or an ionic boron compound. Polymerization activity is developed only when the both materials react with each other. They are generally supplied to the polymerization system through a pipe in a solution state. When a catalyst solution, having polymerization activity and obtained by reacting a metallocene with a co-catalyst, is supplied, it could happen that the polymerization of only an gaseous α-olefin component such as ethylene gas occurs on a trace amount of the catalyst adhered to the inner wall of a pipe and that the obtained polymer drops into the polymer solution, mixes with the copolymer and remains as a gel. To prevent this, the solvent is further caused to flow to wash the inside of the pipe after the catalyst solution is drained. Preferably, a metallocene solution and a co-catalyst solution are supplied into the polymerization system through different pipes.

The gels (ii) can be formed in both the polymerization step and the hydrogenation step. It is considered that the crosslinking of double bonds remaining in the dicyclopentadiene component of the α-olefin-dicyclopentadiene copolymer is not caused by the mechanism of coordination polymerization such as olefin polymerization in the presence of a metallocene catalyst but caused by cationic polymerization mechanism. Therefore, as in the case of the gels (i), preventing the formation of active species for cationic polymerization by removing impurities such as water and oxygen contained in the polymerization system as much as possible and by suppressing the deactivation of the metallocene catalyst leads to the suppression of gelation caused by crosslinking.

Further, the hydrogenation reaction of the polymer solution is carried out without isolating the α-olefin-dicyclopentadiene copolymer from the solution after polymerization. Gelation occurs easily when the copolymer before hydrogenation is isolated and exposed to the air. Further, when the solution after polymerization is exposed from an inert gas atmosphere to the air, gelation gradually begins to occur. Therefore, it is preferred to carry out a hydrogenation reaction by supplying the solution after polymerization to an autoclave swiftly with the solution kept in an inert gas atmosphere and adding a hydrogenation catalyst. Hydrogenation is preferably carried out within 48 hours, more preferably 24 hours, after the end of polymerization.

The gels (iii) are formed in the post-treatment step. The formation of the gels can be suppressed by using an antioxidant, which will be described later, removing the residual catalyst metal component and carrying out the post-treatment step in a nitrogen atmosphere.

When a trace amount of gels still remains in the resin even by using the above methods, the gels can be removed by filtration. The gels (i) and (ii) can be removed by solution filtration and the gels (iii) can be removed by melt filtration.

The residual catalyst metal component contained in the resin causes coloring, burning or gelation during melt molding. The content of the residual catalyst metals in the hydrogenated α-olefin-dicyclopentadiene copolymer used in the present invention is preferably 10 ppm or less, more preferably 5 ppm or less. These figures indicate the total content of all the residual catalyst metals.

Various methods are conceivable for removing catalyst metals. We have already found and proposed an effective method for removing catalysts efficiently when homogeneous catalysts, such as a metallocene catalyst, as a polymerization catalyst and a Ziegler-based hydrogenation catalyst, typified by a combination of tris(acetylacetonato) cobalt or bis(acetylacetonato)nickel and an alkyl aluminum compound, as a hydrogenation catalyst are used (Japanese Patent Applications No. 9-283489 and No. 10-81590). According to these applications, a catalyst metal component can be separated and removed by filtration after precipitated by adding an oxycarboxylic acid, typified by glycolic acid or lactic acid, and water and optionally a mixture of an active hydrogen-containing compound typified by alcohols, to a solution after hydrogenation in predetermined amounts based on the total amount of catalysts used. When methyl aluminoxane (MAO) or ionic boron compound is used as a co-catalyst for polymerization in the presence of a metallocene catalyst, an alkyl aluminum must be used as an alkylating agent for the metallocene in large quantities based on the metallocene. Therefore, the removal of aluminum becomes a problem. However, according to the purification method, the content of aluminum can be suppressed to an extremely low value at 10 ppm or less.

The following purification method can be used when a metallocene catalyst is used as a polymerization catalyst and a heterogeneous catalyst, having a metal such as palladium, rhodium or nickel supported on a support such as carbon, alumina or silica-alumina, is used as a hydrogenation catalyst. An oxycarboxylic acid, typified by glycolic acid and lactic acid, and water, and optionally a mixture of an active hydrogen-containing compound typified by alcohols, are added to the solution after polymerization in predetermined amounts based on the amount of the catalyst used to precipitate a metal component derived from the polymerization catalyst and to separate and remove the metal component by filtration. Thereafter, a heterogeneous hydrogenation catalyst is added to the filtrate to carry out hydrogenation and removed by carrying out filtration again.

Illustrative examples of the residual metal component contained in the hydrogenated α-olefin-dicyclopentadiene copolymer used in the present invention include zirconium, hafnium, titanium, boron and aluminum, all of which are derived from polymerization catalysts, and nickel, cobalt, iron, palladium, rhodium, ruthenium, platinum, manganese, copper, vanadium, magnesium, molybdenum, chromium, zinc and aluminum, all of which are derived from hydrogenation catalysts.

Low-molecular-weight volatile components, which are generally contained in the resin, cause the rough surface of a molded product such as silver streaks or microvoids during melt molding in many cases. As the synthesis of the hydrogenated α-olefin-dicyclopentadiene copolymer used in the present invention is generally carried out using a hydrocarbon solvent, the hydrocarbon volatile component is derived from the solvent. Illustrative examples of the hydrocarbon volatile component include aliphatic hydrocarbons such as pentane, hexane, octane and decane; alicyclic hydrocarbons such as cyclopentane, cyclohexane and cyclooctane; and aromatic hydrocarbons such as benzene, toluene and xylene. Of these, aromatic hydrocarbons are commonly used and toluene and cyclohexane are particularly commonly used.

The hydrocarbon-based volatile component other than the above is tetrahydrodicyclopentadiene. Tetrahydrodicyclopentadiene is formed by hydrogenating dicyclopentadiene, which is a monomer. Two reactions, polymerization and hydrogenation, are required for the synthesis of the hydrogenated α-olefin-dicyclopentadiene copolymer. Preferably, hydrogenation is carried out in succession to polymerization without isolating the polymer from the solution from an economical point of view and the viewpoint of suppressing the gelation of the obtained copolymer.

According to the first production process and the second production process of the present invention, as described above, the hydrogenated α-olefin-dicyclopentadiene copolymer containing substantially no tetrahydrodicyclopentadiene is obtained.

In the molding of the present invention, a resin is preferably used that has a total content of these hydrocarbon-based volatile components of 0.1 wt % or less. When the hydrocarbon-based volatile components remain in a total amount of more than 0.1 wt %, it cannot be hardly suppressed to roughen the surface during molding.

A cyclic olefin resin has a large number of tertiary carbons in its structure. Therefore, when it contacts oxygen at a high temperature, it deteriorates by oxidation to form gels and decomposed products, whereby the discoloration, burning or silver streak of a molded product easily occurs. In the melt molding method of the present invention, these can be suppressed effectively by adding an antioxidant such as a phenol-based compound or phosphorus-based compound to the resin in an amount of preferably 0.01 to 3 wt %, more preferably 0.01 to 1 wt %. When the amount of the antioxidant is smaller than 0.01 wt %, the suppression effect may be insufficient. On the other hand, when the amount is larger than 3 wt %, silver streaks, a hazy molded product, or stains on the surface of the molded product and the mold are readily produced by the vaporization or decomposition of the antioxidant.

As the antioxidant used herein may be a commonly known general-purpose antioxidant such as Irganox 1010 or Irganox 1076 (of Ciba Geigy). Phenol-based antioxidants include, for example, 2,6-di-t-butyl-4-methylphenol, 2,6-di-t-butylphenol, 4-t-butylphenol, 2,4-dimethyl-6-t-butylphenol, 4,4'-bis(2,6-di-t-butylphenol), 2,2'-methylene-bis(4-methyl-6-t-butylphenol), 4,4'-methylene-bis(2,6-di-t-butylphenol), 2,2'-dioxy-3,3'-di-t-butyl-5,5'-dimethyldiphenylmethane, tetrakis[2-(3,5-di-t-butyl-4-hydroxyphenyl)ethylpropionate]methane, pentaerythrityl-tetrakis[3-(3,5-di-t-butyl-4-hydroxyphenyl)propionate], 1,3,5-trimethyl-2,4,6-tris(3,5-di-t-butyl-4-hydroxybenzyl)benzene, tris(3,5-di-t-butyl-4-hydroxybenzyl)isocyanurate, tris(4-t-butyl-3-hydroxy-2,6-dimethylbenzyl)isocyanurate, octadecyl-(3,5-di-t-butyl-4-hydroxyphenyl)propionate, 2,2'-thio-bis-(4-methyl-6-t-butylphenol) and 2,2-thio-diethylenebis[3-(3,5-di-t-butyl-4-hydroxyphenyl)propionate].

Phosphorus-based antioxidants include, for example, tris(2,4-di-t-butylphenyl)phosphite, bis(2,6-di-t-butyl-4-methylphenyl)pentaerythritol diphosphite, tris(nonylphenyl)phosphite and 3,5-di-t-butyl-4-hydroxybenzyl phosphonate diethyl ester.

They may be used alone or in combination of two or more. A phenol-based antioxidant may be mixed with a phosphorus-based antioxidant.

In the above-described purification method which comprises removing the catalyst components by filtration and distilling off the solvent, the gelation and deterioration of the resin during the removal of the solvent at a high temperature can be suppressed by adding these antioxidants to the solution after filtration.

Various additives other than the above antioxidants may be added to the hydrogenated α-olefin-dicyclopentadiene copolymer used in the present invention as required. The additives include an ultraviolet absorber, bluing agent for reducing the yellowness of a molded product, release agent, antistatic agent and glass fibers. These additives preferably have a large molecular weight to prevent vaporization and elution at the time of molding and are used in as small an amount as possible to prevent a reduction in transparency.

To melt-mold the resin, it is dried first. In the present invention, it is preferred to dry the resin in advance. To suppress deterioration by oxidation, vacuum drying or drying in a nitrogen gas stream is particularly preferably carried out to remove oxygen contained in the resin.

In the melt molding of the present invention, melt molding such as injection molding or melt extrusion is carried out using the hydrogenated α-olefin-dicyclopentadiene copolymer at a melting temperature of 230 to 380° C. and a mold temperature of (Tg–100) to (Tg–10)° C. "Tg" used herein is the glass transition temperature of the hydrogenated α-olefin-dicyclopentadiene copolymer. Outside the above range, a molded product having satisfactory characteristic properties is difficult to obtain.

When the melting temperature is below 230° C., the flowability of the resin becomes insufficient and the distortion of the obtained molded product becomes large disadvantageously. On the other hand, when the melting temperature is above 380° C., the discoloration, decomposition and burning of the molded product readily occur. The melting temperature is preferably in the range of 250 to 370° C. For molding an optical disk substrate, it is important to increase the flowability of the resin and it is preferable to mold the optical disk substrate at a temperature of 280 to 370° C.

When the mold temperature is below (Tg–100)° C., the distortion of the molded product becomes large and pit replicability which is required in an optical disk substrate deteriorates. On the other hand, when the mold temperature is above (Tg–10)° C., the molded product is easily deformed or warped while removed from the mold since the mold temperature is close to the glass transition temperature of the hydrogenated α-olefin-dicyclopentadiene copolymer used.

The optimum melting temperature, the optimum mold temperature and the optimum molecular weight of the above hydrogenated α-olefin-dicyclopentadiene copolymer are selected from the above ranges in consideration of various factors such as the moldability, optical properties, mechanical properties and economy of the obtained product.

Although the melt molding of the present invention can be carried out in the air atmosphere, it is preferred to carry out melt molding in a nitrogen atmosphere in order to suppress the coloring and gelation of the molded product which are caused by deterioration by oxidation. In this case, the supply of the resin to a molding machine is carried out in a nitrogen gas atmosphere.

According to the present invention, optical materials typified by optical disk substrates, optical lenses and optical sheets having excellent optical properties, moldability and mechanical properties can be molded from the hydrogenated α-olefin-dicyclopentadiene copolymer. A single metal layer or multiple metal lagers may be formed on the surfaces of the obtained optical materials by deposition or sputtering according to application purpose. An organic layer such as a protective layer or gas barrier layer may also be formed by coating.

The following examples are provided for the purpose of further illustrating the present invention but are in no way to be taken as limiting.

In Examples 1 to 3, procedures were carried out in an inert atmosphere such as argon or nitrogen unless otherwise stated.

Toluene, cyclohexane, tetrahydronaphthalene and dicyclopentadiene were all purified by distillation and fully dried in accordance with a commonly used method before used.

Isopropylidene-(9-fluorenyl)(cyclopentadienyl) zirconium dichloride was purchased from Boulder Scientific Co., Ltd. as the metallocene and used without further purification.

Trityl-tetrakis(pentafluorophenyl)borate was purchased from Toso Akzo Co., Ltd. as the ionic boron compound and used without further purification.

Polymethyl aluminoxane (PMAO) was purchased from Toso Akzo Co., Ltd. as the aluminoxane and a 2 M toluene solution of PMAO was prepared and used.

Triisobutyl aluminum was purchased from Toso Akzo Co., Ltd. and used without further purification.

Tris(acetylacetonato)cobalt was purchased from Wako Pure Chemical Industries, Ltd. and used without further purification.

Pentaerythrityl-tetrakis[3-(3,5-di-t-butyl-4-hydroxyphenyl)propionate] (Irganox 1010) was purchased from Tokyo Kasei Kogyo Co., Ltd. and used without further purification.

Nickel silica alumina was purchased from Aldrich Co., Ltd.

Measurement items were measured in accordance with the following methods.

solution viscosity: measured using a BH viscometer of Tokyo Keiki Co., Ltd.

glass transition temperature (Tg (° C.)): measured at a temperature elevation rate of 20° C./min using the 2920 DSC of TA Instruments Co., Ltd.

molecular weight: The reduced viscosity $\eta_{sp}/c$ (dl/g) at 30° C. of a toluene solution having a concentration of 0.5 g/dl was measured.

composition of solution: The composition of a solution excluding a polymer was measured using a GC-9A gas chromatograph of Shimadzu Corporation.

degree of hydrogenation: determined by $^1$H-NMR using a JNM-A-400 Nuclear Magnetic Resonance spectrometer of JEOL Ltd.

content of gel component in resin: The resin is dissolved in toluene to prepare a 5 wt % solution, the solution is filtered with a membrane filter having a pore diameter of 1 µm, and the weight of the residue remaining on the filter after the filter is dried is measured to calculate the content.

amount of residual metal in resin: determined by ICP emission spectral analysis total light transmittance: measured using a UV-240 spectrophotometer for ultraviolet and visible region of Shimadzu Corporation.

coloring of molded product: b value is measured with a CR-200 color difference meter of Minolta Camera Co., Ltd. and discoloration is estimated based on the difference in b-value between the molded product and that of a white calibration plate (b=+2.62).

observation of surface of molded product (disk substrate): measured using a SFA-300 Atomic Force Microscope of Seiko Instruments Inc.

birefringence of disk substrate: measured with a single pass at a wavelength of 633 nm using the ADR-200B birefringence instrument of Ork Seisakusho Co., Ltd.

REFERENCE EXAMPLE 1

Figure 2:
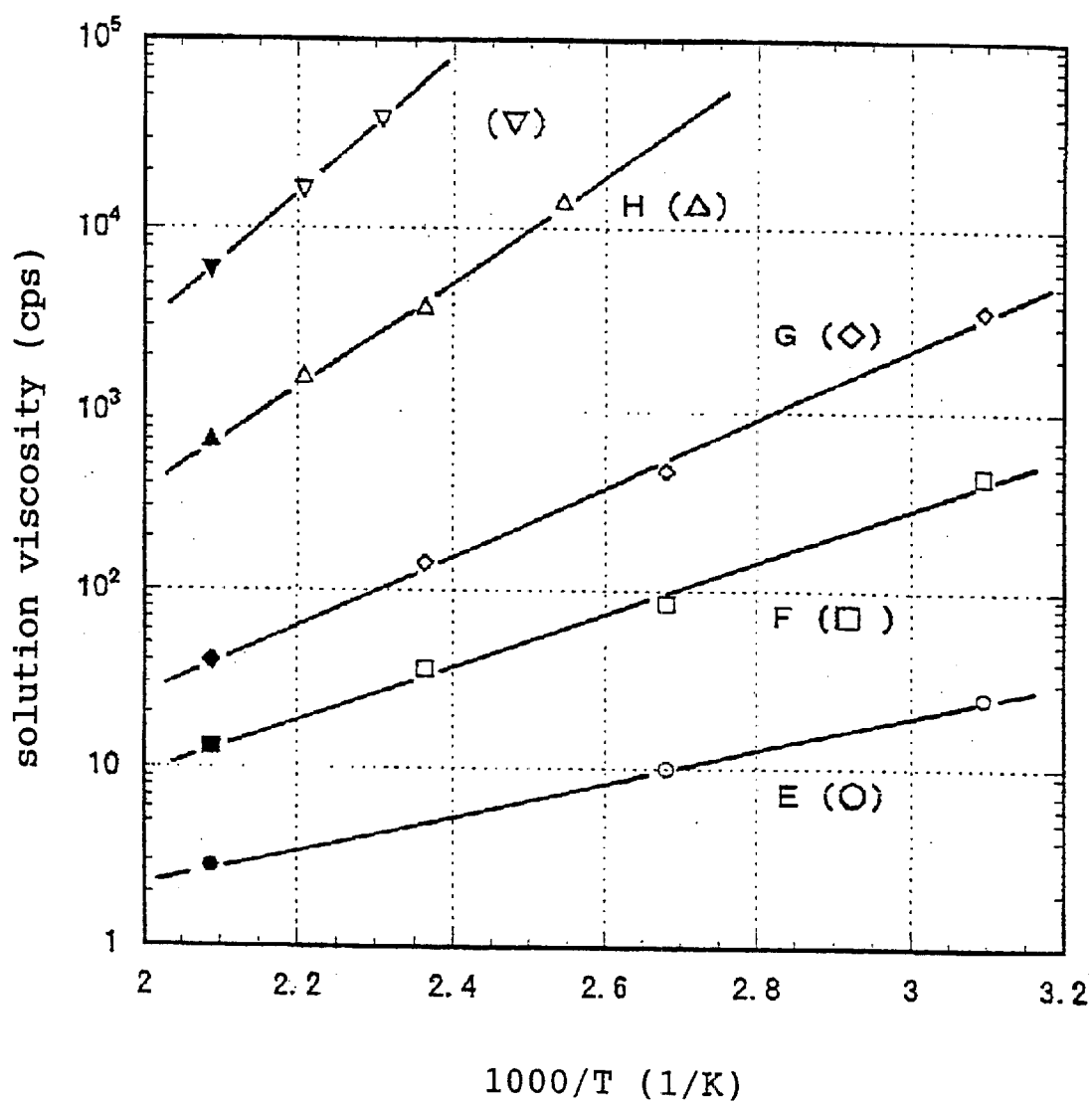
FIG. 2 shows the relationship between the solution viscosity and temperature of a hydrogenated α-olefin-dicyclopentadiene copolymer dissolved in tetrahydronaphthalene obtained in Reference Example 1 when the solution concentration is used as a parameter.

The temperature-dependency and solution-concentration-dependency of the solution viscosity of a hydrogenated ethylene-dicyclopentadiene copolymer having a glass transition temperature of 148° C. and a reduced viscosity of 0.40 dl/g were examined. Toluene and tetrahydronaphthalene were used as solvents. The results are shown in FIG. 1 and FIG. 2. The relationship between the solution concentration and the solution viscosity of each of a toluene solution of a hydrogenated ethylene-dicyclopentadiene copolymer at 110° C. and a tetrahydronaphthalene solution of the hydrogenated copolymer at 208° C. was derived from these results. The results are shown in FIG. 3.

Figure 3:
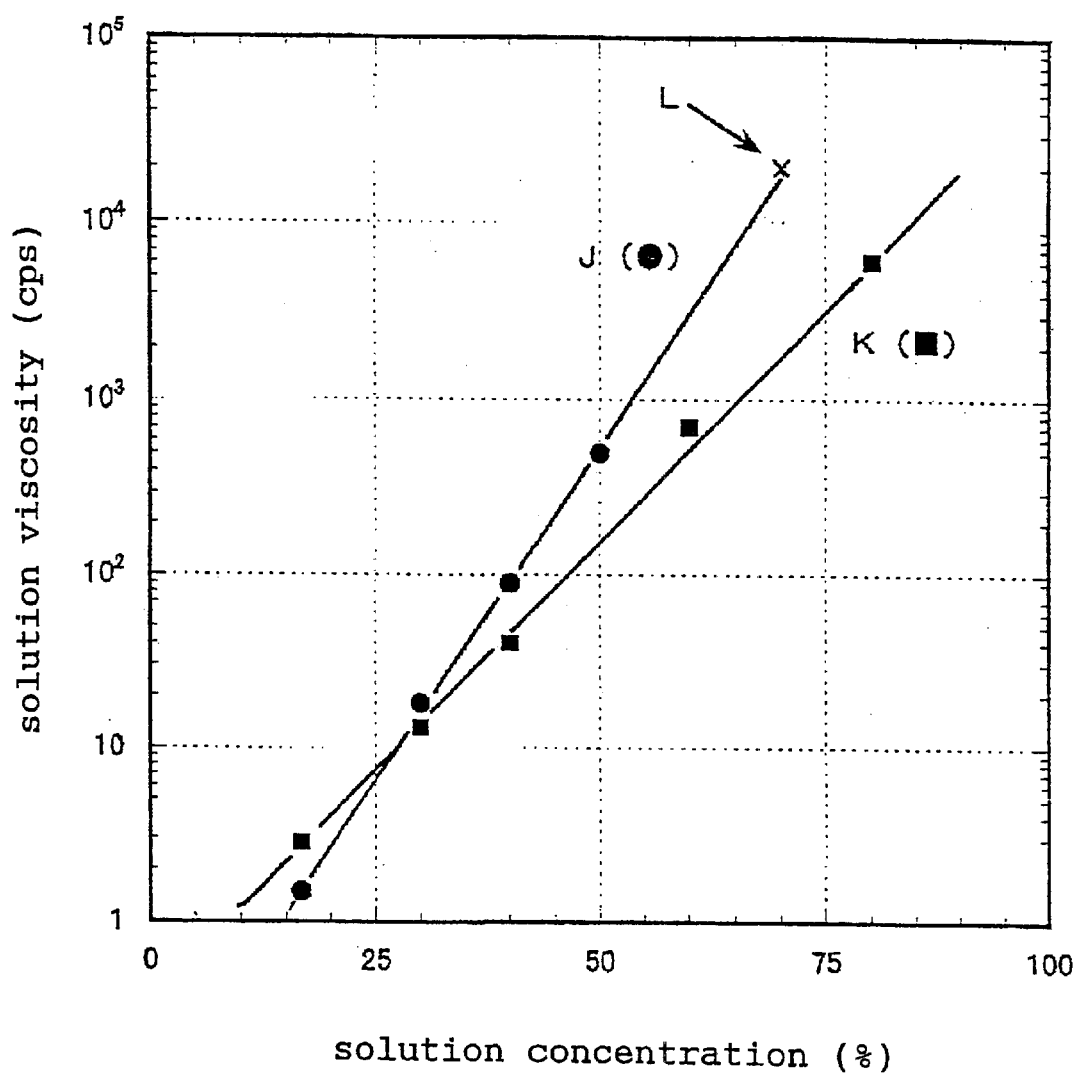
FIG. 3 shows the relationship (straight line J) between the solution viscosity at 110° C. of a hydrogenated α-olefin-dicyclopentadiene copolymer dissolved in toluene obtained in Reference Example 1 and the solution concentration and the relationship (straight line K) between the solution viscosity at 208° C. of the hydrogenated α-olefindicyclopentadiene copolymer dissolved in tetrahydronaphthalene and the solution concentration.

Letters A to L in FIGS. 1 to 3 indicate the following.

A: a straight line showing the relationship between the solution viscosity and temperature of a 17 wt % toluene solution of the hydrogenated α-olefin-dicyclopentadiene copolymer. White symbols indicate actual measurement values and black symbols indicate extrapolation values at 110° C.

B: a straight line showing the relationship between the solution viscosity and temperature of a 30 wt % toluene solution of the hydrogenated α-olefin-dicyclopentadiene copolymer. White symbols indicate actual measurement values and black symbols indicate extrapolation values at 110° C.

C: a straight line showing the relationship between the solution viscosity and temperature of a 40 wt % toluene solution of the hydrogenated α-olefin-dicyclopentadiene copolymer. White symbols indicate actual measurement values and black symbols indicate extrapolation values at 110° C.

D: a straight line showing the relationship between the solution viscosity and temperature of a 50 wt % toluene solution of the hydrogenated α-olefin-dicyclopentadiene copolymer. White symbols indicate actual measurement values and black symbols indicate extrapolation values at 110° C.

E: a straight line showing the relationship between the solution viscosity and temperature of a 17 wt % tetrahydronaphthalene solution of the hydrogenated α-olefin-dicyclopentadiene copolymer. White symbols indicate actual measurement values and black symbols indicate extrapolation values at 208° C.

F: a straight line showing the relationship between the solution viscosity and temperature of a 30 wt % tetrahydronaphthalene solution of the hydrogenated α-olefin-dicyclopentadiene copolymer. White symbols indicate actual measurement values and black symbols indicate extrapolation values at 208° C.

G: a straight line showing the relationship between the solution viscosity and temperature of a 40 wt % tetrahydronaphthalene solution of the hydrogenated α-olefin-dicyclopentadiene copolymer. White symbols indicate actual measurement values and black symbols indicate extrapolation values at 208° C.

H: a straight line showing the relationship between the solution viscosity and temperature of a 60 wt % tetrahydronaphthalene solution of the hydrogenated α-olefin-dicyclopentadiene copolymer. White symbols indicate actual measurement values and black symbols indicate extrapolation values at 208° C.

I: a straight line showing the relationship between the solution viscosity and temperature of a 80 wt % tetrahydronaphthalene solution of the hydrogenated α-olefin-dicyclopentadiene copolymer. White symbols indicate actual measurement values and black symbols indicate extrapolation values at 208° C.

J: a straight line showing the relationship between the solution viscosity and solution concentration at 110° C. of a toluene solution of the hydrogenated α-olefin-dicyclopentadiene copolymer obtained from FIG. 1.

K: a straight line showing the relationship between the solution viscosity and solution concentration at 208° C. of a tetrahydronaphthalene solution of the hydrogenated α-olefin-dicyclopentadiene copolymer obtained from FIG. 2.

L: a point where a solid begins to precipitate out of a toluene solution of the hydrogenated α-olefin-dicyclopentadiene copolymer at 110° C.

EXAMPLE 1

There were charged 343 g (2.6 mols) of dicyclopentadiene, 1,320 g of tetrahydronaphthalene and 36 g of triisobutyl aluminum into a 3-liter autoclave. The autoclave was pressurized with ethylene having a pressure of 1.5 atm, a tetrahydronaphthalene solution containing 124 img (0.29 mmol) of isopropylidene-(9-fluorenyl) (cyclopentadienyl) zirconium dichloride and 3 g of triisobutyl aluminum and a tetrahydronaphthalene solution containing 250 mg (0.27 mmol) of trityl-tetrakis (pentafluorophenyl)borate were added, and polymerization was carried out at 30° C. Ethylene having a pressure of 1.5 atm was constantly supplied during the polymerization, and the supply of ethylene was stopped when 2.34 mols-of ethylene was consumed to obtain a polymer solution. The obtained ethylene-dicyclopentadiene copolymer had a Tg of 153° C. and a reduced viscosity of 0.77 dl/g, and the molar fraction of dicyclopentadiene in the copolymer was 46%.

The copolymer solution was transferred to a 5-liter autoclave, and a tetrahydronaphthalene solution containing 3.0 g (8.4 mmols) of tris(acetylacetonato)cobalt and 4.8 g of truisobutyl aluminum was added. The autoclave was pressurized with hydrogen having a pressure of 40 atm, and a hydrogenation reaction was carried out at 110° C. for 3 hours to obtain a hydrogenated ethylene-dicyclopentadiene copolymer solution. The obtained hydrogenated copolymer had a Tg of 153° C., a reduced viscosity of 0.47 dl/g and a degree of hydrogenation of 99.9% or more.

To the hydrogenated copolymer solution were added 21 g of lactic acid and 2.7 g of water. A reaction was carried out at 95° C. for 2 hours, and the polymerization catalyst and the hydrogenation catalyst were precipitated. The solution mixture was filtered with Celite to obtain a hydrogenated ethylene-dicyclopentadiene copolymer solution containing substantially no catalyst residue. The solution contained 430 parts by weight of tetrahydronaphthalene and 28 parts by weight of tetrahydrodicyclopentadiene based on 100 parts by weight of the hydrogenated ethylene-dicyclopentadiene copolymer. The number of parts by weight of each volatile component based on 100 parts by weight of the copolymer or the hydrogenated copolymer is expressed by phr hereinafter.

Figure 4:
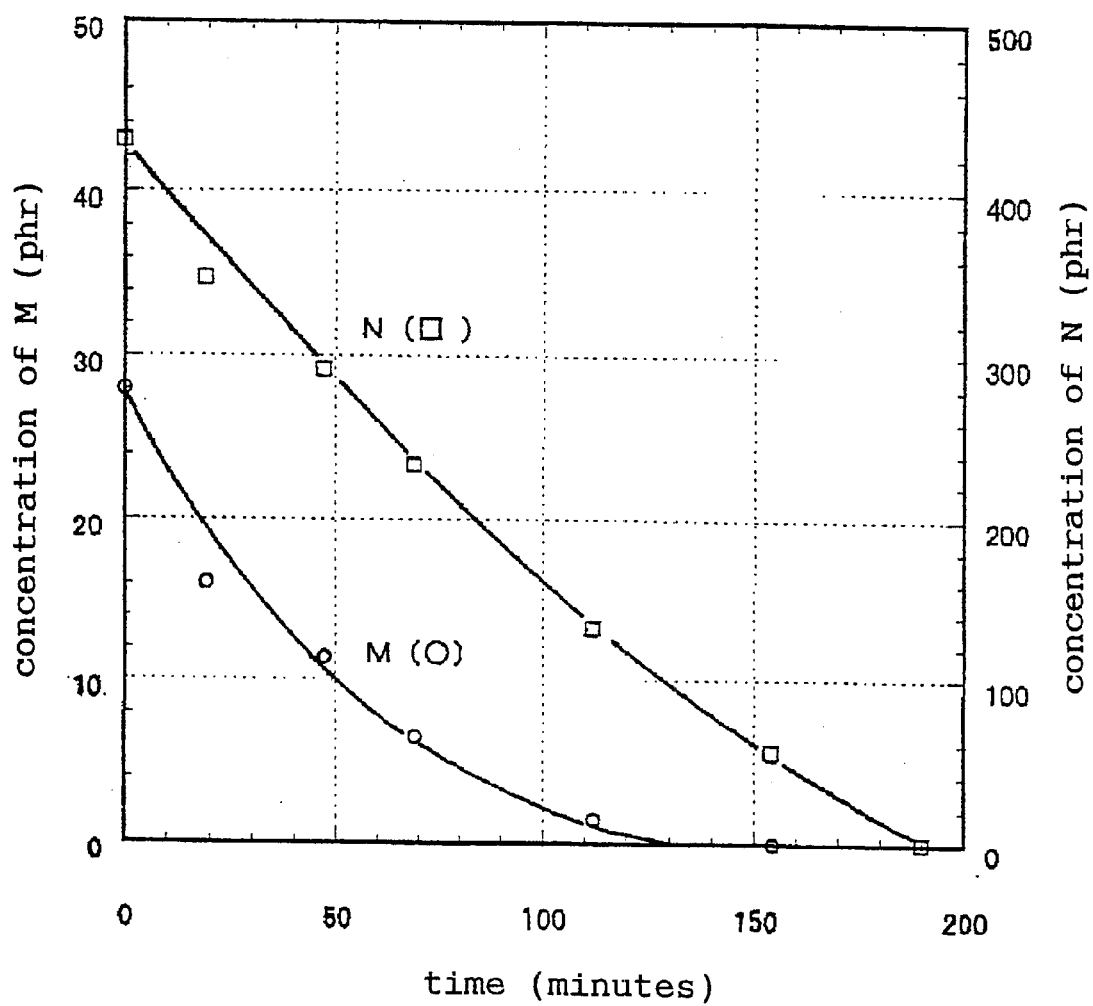
FIG. 4 shows change of time in the composition of a hydrogenated α-olefin-dicyclopentadiene copolymer solution obtained in Example 1 in the step of removing volatile components from the solution.

There was charged 250 g of the obtained hydrogenated copolymer solution into a 500-ml flask, and 125 mg of the Irganox 1010 as an antioxidant was also added to remove volatile components at normal pressure. The temperature of the solution was 205 to 208° C. The composition of the solution was analyzed and tetrahydrodicyclopentadiene was no longer detected when the amount of tetrahydronaphthalene reached 56 phr. FIG. 4 shows changes in the composition of the solution. The solution viscosity at this point was estimated to be 1,000 cps from FIG. 3. The volatile components were continued to be removed by elevating the temperature of the solution to 300° C. to obtain the hydrogenatedcopolymerinamoltenstate. Duringtheremoval, the solid hydrogenated polymer did not precipitate out of the solution.

Letters M and N in FIG. 4 indicate the following.
M: a curve showing change of time in the concentration of tetrahydrodicyclopentadiene contained in the hydrogenated α-olefin-dicyclopentadiene copolymer solution obtained in Example 1
N: a curve showing change of time in the concentration of tetrahydronaphthalene contained in the hydrogenated α-olefin-dicyclopentadiene copolymer solution obtained in Example 1

COMPARATIVE EXAMPLE 1

A polymerization reaction, hydrogenation reaction, catalyst deposition reaction and catalyst removal operation were carried out in the same manner as in Example 1 to obtain a hydrogenated ethylene-dicyclopentadiene copolymer solution except that toluene was used as a solvent and that ethylene was pressurized at 1 atm. Before hydrogenation, the copolymer had a Tg of 150° C. and an $\eta_{sp}/c$ of 0.67, and the molar fraction of dicyclopentadiene in the copolymer was 45%. The hydrogenated copolymer had a Tg of 147° C., a reduced viscosity of 0.43 and a degree of hydrogenation of 99.9% or more. The solution contained 430 phr of toluene and 28 phr of tetrahydrodicyclopentadiene.

Figure 5:
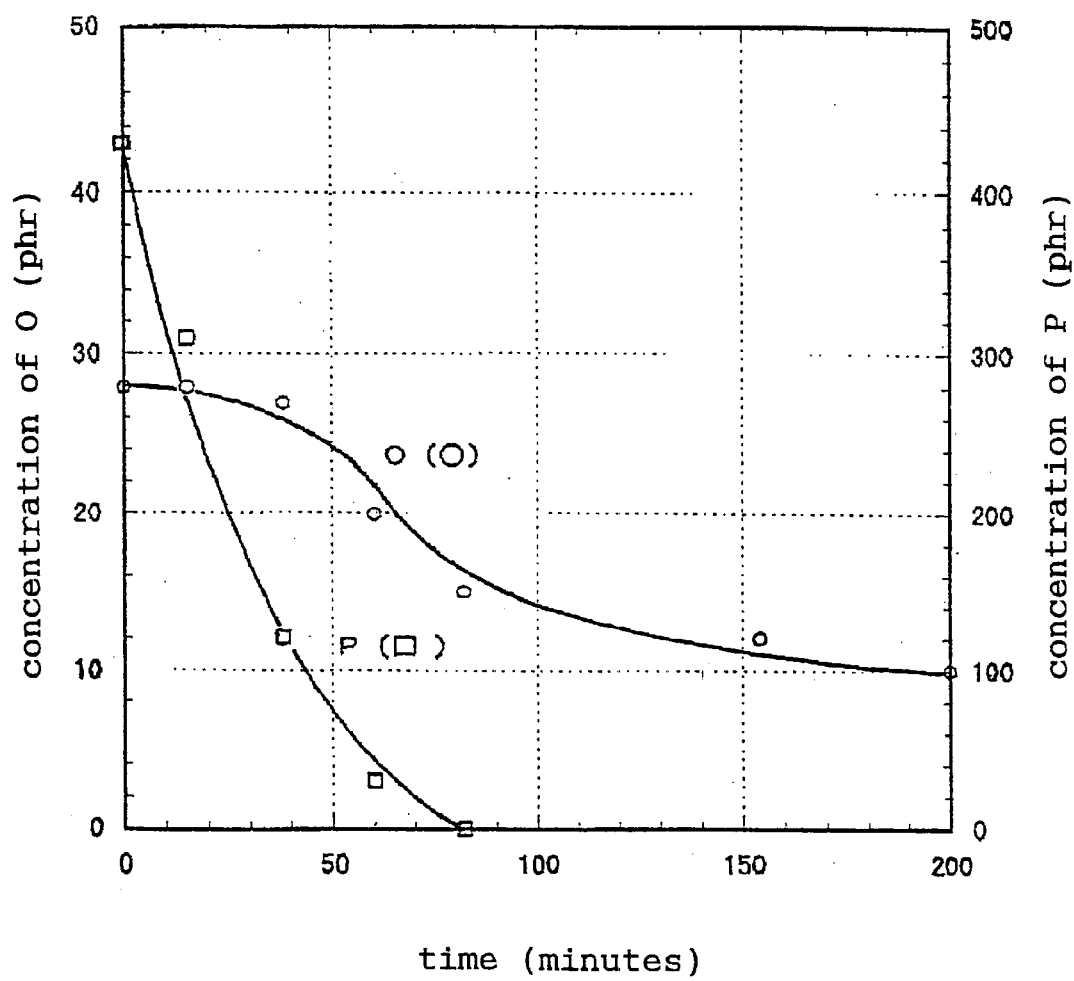
FIG. 5 shows change of time in the composition of a hydrogenated α-olefin-dicyclopentadiene copolymer solution obtained in Comparative Example 1 in the step of removing volatile components from the solution.

There was charged 250 g of the obtained hydrogenated copolymer solution into a 500-ml flask, and 125 mg of Irganox 1010 as an antioxidant was also added to remove volatile components at normal pressure. The temperature of the solution was 110 to 115° C. until toluene was almost completely removed. The composition of the solution was analyzed during this removal. FIG. 5 shows changes in composition. Toluene was distilled off first, and most of tetrahydrodicyclopentadiene was then distilled off. The solution viscosity sharply increased as the concentration of the copolymer increased, and the copolymer precipitated out on the wall of the flask as a solid after the concentration of the copolymer exceeded 70%. The solution viscosity at this point was estimated to be 25,000 cps from FIG. 1 and tetrahydrodicyclopentadiene remained in the copolymer in an amount of 20 phr. Toluene was almost removed as heating was further continued, and the copolymer precipitated out and, at the same time, the temperature rose. Although tetrahydrodicyclopentadiene was distilled off for 2 hours after the temperature was elevated to 225° C., the copolymer was not molten yet and tetrahydrodicyclopentadiene could not be distilled off completely. Tetrahydrodicyclopentadiene remained in the copolymer in an amount of 10 phr.

Letters O and P in FIG. 5 indicate the following.
O: a curve showing change of time in the concentration of tetrahydrodicyclopentadiene contained in the hydrogenated α-olefin-dicyclopentadiene copolymer solution obtained in Comparative Example 1
P: a curve showing change of time in the concentration of toluene contained in the hydrogenated α-olefin-dicyclopentadiene copolymer solution obtained in Comparative Example 1

EXAMPLE 2

A polymerization reaction was carried out in the same manner as in Example 1 except that cyclohexane was used as a solvent and that ethylene was pressurized at 2 atm. The copolymer had a Tg of 147° C. and an $\eta_{sp}/c$ of 0.64, and the molar fraction of dicyclopentadiene in the copolymer was 46%. There were added 11 g of lactic acid and 1.4 g of water to the obtained polymer solution, and the resulting solution was allowed to react for 2 hours to precipitate the polymerization catalyst. The obtained polymer solution mixture was filtered with Celite and the filtrate was transferred to a 5-liter autoclave. Thirty grams of nickel silica alumina was added to the autoclave as a hydrogenation catalyst and the autoclave was pressurized with hydrogen having a pressure of 100 atm to carry out a hydrogenation reaction at 150° C. The hydrogenation catalyst was removed from the obtained hydrogenated copolymer solution mixture with Celite to obtain a hydrogenated ethylene-dicyclopentadiene copolymer solution. The hydrogenated copolymer had a Tg of 144° C., a reduced viscosity of 0.41 and a degree of hydrogenation of 99.9% or more. The solution contained 420 phr of cyclohexane and 26 phr of tetrahydrodicyclopentadiene.

Figure 6:
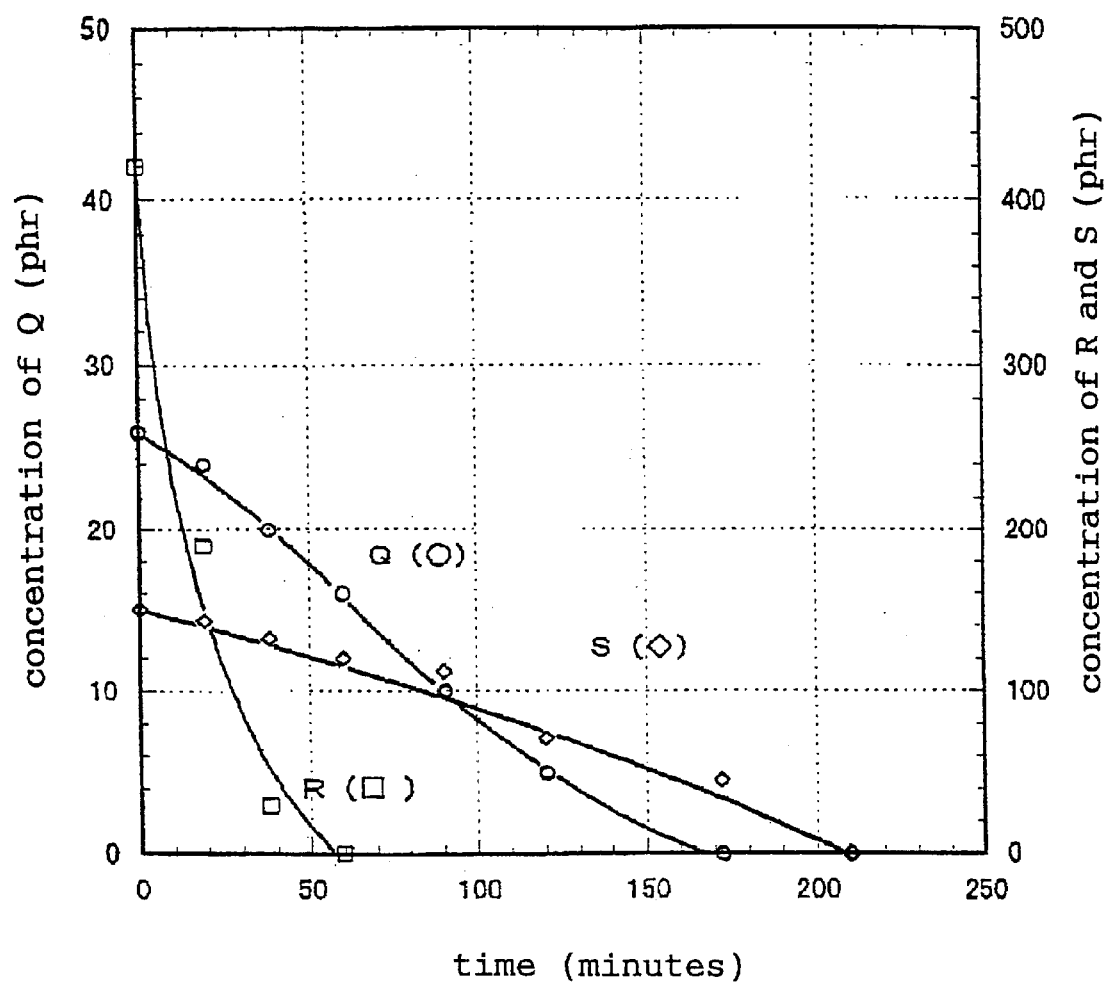
FIG. 6 shows change of time in the composition of a hydrogenated α-olefin-dicyclopentadiene copolymer solution obtained in Example 2 in the step of removing volatile components from the solution.

There were charged 250 g of the obtained hydrogenated copolymer solution into a 1-liter flask, 69 g (150 phr based on the hydrogenated copolymer) of tetrahydronaphthalene, and 125 mg of Irganox 1010 as an antioxidant, to remove volatile components at normal temperature. The temperature of the solution was 90 to 210° C. and the composition of the solution was analyzed during the removal. FIG. 6 shows changes in composition. Tetrahydrodicyclopentadiene was no longer detected in the solution when the concentration of tetrahydronaphthalene reached 45 phr based on the hydrogenated copolymer. The solution viscosity at this point was estimated to be 2,000 cps from FIG. 1. The volatile components were further removed as the solution temperature was elevated to 300° C. to obtain the hydrogenated copolymer in a molten state. During this removal, the solid hydrogenated copolymer did not precipitate out of the solution.

Letters Q, R and S in FIG. 6 indicate the following.
Q: a curve showing change of time in the concentration of tetrahydrodicyclopentadiene contained in the hydrogenated α-olefin-dicyclopentadiene copolymer solution obtained in Example 2
R: a curve showing change of time in the concentration of cyclohexane contained in the hydrogenated α-olefin-dicyclopentadiene copolymer solution obtained in Example 2
S: a curve showing change of time in the concentration of tetrahydronaphthalene contained in the hydrogenated α-olefin-dicyclopentadiene copolymer solution obtained in Example 2

EXAMPLE 3

Figure 7:
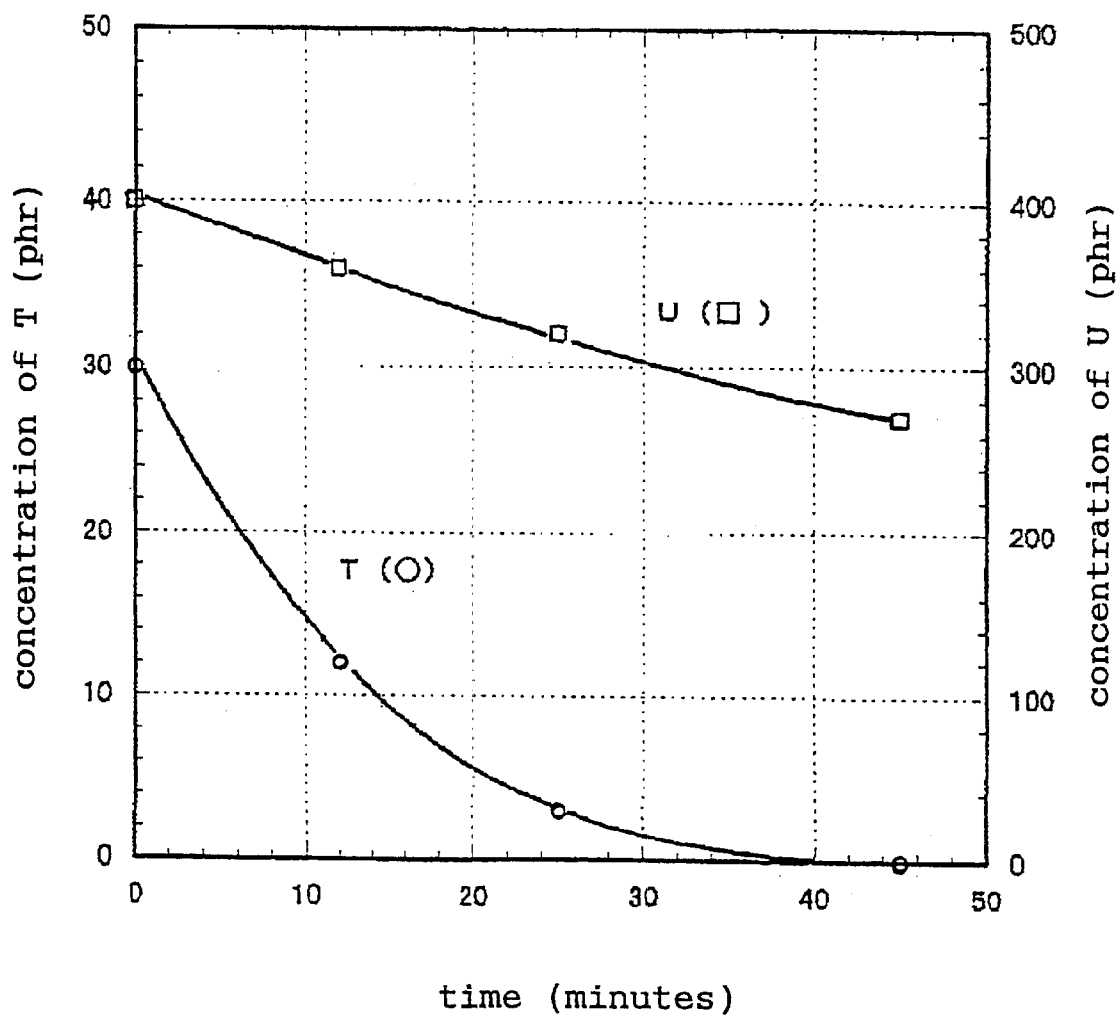
FIG. 7 shows change of time in the composition of a hydrogenated α-olefin-dicyclopentadiene copolymer solution obtained in Example 3 in the step of removing volatile components from the solution.

A polymerization reaction was carried out using a flask in the same manner as in Example 1 to obtain an ethylene-dicyclopentadiene copolymer solution except that everything used in Example 1 was scaled down to ⅐. The copolymer had a Tg of 143° C. and an $\eta_{sp}/c$ of 0.59, and the molar fraction of dicyclopentadiene in the copolymer was 43%. The solution contained 400 phr of tetrahydronaphthalene and 30 phr of dicyclopentadiene. The pressure of the flask was reduced to 50 mmHg to remove volatile components at 70° C. The composition of the solution was analyzed during this and dicyclopentadiene was no longer detected in the solution when the amount of tetrahydronaphthalene reached 270 phr. FIG. 7 shows changes in the composition of the solution. The solution viscosity at this point was estimated to be 300 cps from FIG. 2.

Sixty grams of tetrahydronaphthalene was added to the obtained copolymer solution. The resulting solution was transferred to a 1-liter autoclave, and a tetrahydronaphthalene solution containing 0.4 g (1.1 mmols) of tris(acetylacetonato)cobalt and 0.7 g of triisobutyl aluminum was added. The autoclave was pressurized with hydrogen having a pressure of 40 atm and a hydrogenation reaction was carried out at 110° C. for 3 hours to obtain a hydrogenated ethylene-dicyclopentadiene copolymer solution. The obtained hydrogenated copolymer had a Tg of 143° C. and a reduced viscosity of 0.42 dl/g.

Three grams of lactic acid and 0.4 g of water were added to the hydrogenated copolymer solution. The resulting solution was allowed to react at 95° C. for 2 hours to precipitate the polymerization catalyst and the hydrogenation catalyst. The solution mixture was filtered with Celite to obtain a hydrogenated ethylene-dicyclopentadiene copolymer solution containing substantially neither tetrahydrodicyclopentadiene nor catalyst residue.

The hydrogenated copolymer solution was charged into a 500-ml flask, and 125 mg of Irganox 1010 was also added to the flask as an antioxidant. Volatile components were further removed at normal pressure as the temperature of the solution was elevated to 300° C. to obtain the hydrogenated copolymer in a molten state. During the removal, the solid hydrogenated copolymer did not precipitate out of the solution.

Letters T and U in FIG. 7 indicate the following.
T: a curve showing change of time in the concentration of dicyclopentadiene contained in the hydrogenated α-olefin-dicyclopentadiene copolymer solution obtained in Example 3
U: a curve showing change of time in the concentration of tetrahydronaphthalene contained in the hydrogenated α-olefin-dicyclopentadiene copolymer solution obtained in Example 3

REFERENCE EXAMPLE 2

The inside of a 3-liter stainless steel polymerization reactor was substituted with nitrogen, and 181 g of dicyclopentadiene, 1,150 g of toluene and 3.4 g of truisobutyl aluminum were added to the reactor. After the inside of the reactor was substituted with ethylene having normal pressure, a metallocene solution, obtained by dissolving 122 mg of isopropylene(9-fluorenyl)(cyclopentadienyl)zirconium dichloride and 0.2 g of triisobutyl aluminum in 85 g of toluene, and a co-catalyst solution, obtained by dissolving 267 mg of trityl-tetrakis(pentafluorophenyl)borate in 85 g of toluene, were divided into three portions, which were added to a polymerization system separately at intervals of 20 minutes to carry out polymerization at 30° C. During the polymerization, ethylene having normal pressure was constantly supplied, and 157 g of dicyclopentadiene was added at such a rate that ensures the addition rate of dicyclopentadiene and the consumption rate of ethylene should become 42:58. The supply of ethylene was stopped to terminate the reaction when the consumption of ethylene reached 90% of a molar amount equivalent to 338 g of the added dicyclopentadiene (110 minutes after the first addition of the catalyst solution).

The obtained polymerization reaction solution was immediately supplied to a 5-liter autoclave in a nitrogen atmosphere, and a hydrogenation catalyst solution, prepared by reacting 3.0 g of tris(acetylacetonato)cobalt with 4.8 g of triisobutyl aluminum in 20 ml of toluene in a nitrogen atmosphere at room temperature for 5 minutes, was added the autoclave. Thereafter, ahydrogenationreactionwas carried out at a hydrogen pressure of 30 atm and a temperature of 110° C. for 150 minutes.

After the solution resulting from the hydrogenation reaction was cooled to 95° C., an aqueous solution of 20.5 g of lactic acid in 2.7 g of water was added dropwise to the solution under agitation in a nitrogen atmosphere over 10 minutes to carry out a reaction at 95° C. for another 2 hours. The reaction solution changed from black brown to a turbid pink slurry. The slurry was then filtered. A filter (Naslon NF-05) having a pore diameter of 5 μm was set up in a 11-cm-diameter cylindrical filtering device, and 5 cm of Celite and a flannel fabric were placed on the filter in this order to carry out pressure filtration. Filtration proceeded smoothly. The obtained filtrate was subjected to an adsorption treatment using basic alumina to obtain an achromatic transparent resin solution.

Tetrahydronaphthalene and pentaerythrityl-tetrakis[3-(3, 5-di-t-butyl-4-hydroxyphenyl)propionate] was added to this solution in an amount of 150 wt % and 0.2 wt % based on the hydrogenated copolymer, respectively, and then the solvent and tetrahydrodicyclopentadiene were distilled off. Toluene was distilled off at normal pressure at first, the temperature was raised gradually to 280° C., and distillation was continued until volatile components could not be identified at a reduced pressure. Thereafter, the molten resin was supplied to an extruder in a nitrogen atmosphere to obtain an achromatic transparent pellet. When the pellet was examined, it had a reduced viscosity $\eta_{sp}/c$, at 30° C. in a toluene solution having a concentration of 0.5 g/dl, of 0.40 dl/g, a glass transition temperature of 147° C. and a degree of hydrogenation of 99.9% or more (double bond signals were not observed when measured by $^1$H-NMR). When the amounts of residual metals were determined by ICP emission spectral analysis, Zr was contained in an amount of 0.1 ppm or less, B in an amount of 0.1 ppm or less, Co in an amount of 0.7 ppm, and Al in an amount of 1.8 ppm. When a gel component contained in the pellet was examined by filtering a 5 wt % toluene solution prepared by re-dissolving the pellet in toluene with a micro-filter having a pore diameter of 1 pm, the gel component was contained in an amount of 0.01 wt % or less. Further, when the content of hydrocarbon-based volatile components contained in the pellet was measured by gas chromatography (GC), toluene, tetrahydrodicyclopentadiene and tetrahydronaphthalene were not detected. Thus, it was found that most of the hydrocarbon-based volatile components were distilled off.

REFERENCE EXAMPLE 3

The pellet of a hydrogenated ethylene-dicyclopentadiene copolymer was obtained in the same manner as in Reference Example 2 except that a metallocene solution and a co-catalyst solution were divided into 5 portions, which were added to a polymerization reaction system separately at intervals of 20 minutes, and that a polymerization reaction was terminated 180 minutes after the first addition of the catalyst solutions. When the pellet was examined in the same manner as in Reference Example 2, it had a reduced viscosity $\eta_{sp}/c$ of 0.55 dl/g (toluene solution having a concentration of 0.5 g/dl, 30° C.), a glass transition temperature of 145° C. and a degree of hydrogenation of 99.9% or more (double bond signals were not observed when measured by $^1$H-NMR). As for the amounts of residual metals, Zr was contained in an amount of 0.1 ppm or less, B in an amount of 0.1 ppm or less, Co in an amount of 0.6 ppm, and Al in an amount of 1.6 ppm. The content of the gel in the pellet was 0.01 wt % or less, and toluene, tetrahydrodicyclopentadiene and tetrahydronaphthalene were not observed in the pellet by GC. Thus, it was found that most of the hydrocarbon-based volatile components were distilled off.

REFEREMCE EXAMPLE 4

The pellet of a hydrogenated ethylene-dicyclopentadiene copolymer was obtained in the same manner as in Reference Example 2 except that the reaction temperature at the time of polymerization was 60° C. When the pellet was examined in the same manner as in Reference Example 2, it had a reduced viscosity $\eta_{sp}/c$ of 0.22 dl/g (toluene solution having a concentration of 0.5 g/dl, 30° C.), a glass transition temperature of 149° C., and a degree of hydrogenation of 99.9% or more (double bond signals were not observed when measured by $^1$H-NMR). As for the amounts of residual metals, Zr was contained in an amount of 0.1 ppm or less, B in an amount of 0.1 ppm or less, Co in an amount of 0.5 ppm, and Al in an amount of 0.9 ppm. The content of the gel in the pellet was 0.01 wt % or less, and toluene and tetrahydrodicyclopentadiene were not observed in the pellet by GC. Thus, it was found that most of the hydrocarbon-based volatile components were distilled off.

REFERENCE EXAMPLE 5

After polymerization and hydrogenation were carried out in the same manner as in Reference Example 2, 20 ml of methanol was added dropwise to a hydrogenation reaction solution cooled to room temperature. The resulting solution was ejected into a large amount of a mixed solution of acetone and methanol to form a precipitate. The precipitate was separated by filtration, washed with acetone, methanol and water, and dried to obtain white powder. Pentaerythrityl-tetrakis[3-(3,5-di-t-butyl-4-hydroxyphenyl)propionate] was added to the powder in an amount of 0.2 wt %, and the resulting mixture was hot-pressed at 220° C. to obtain a plate-like product, which was then crushed with a crusher to obtain a block of a hydrogenated ethylene-dicyclopentadiene copolymer. This block resin had a reduced viscosity $\eta_{sp}/c$ of 0.40 dl/g (toluene solution having a concentration of 0.5 g/dl, 30° C.), a glass transition temperature of 147° C., and a degree of hydrogenation of 99.9% or more (double bond signals were not observed when measured by $^1$H-NMR) as in Reference Example 2. However, the amounts of residual metals were very large with 8 ppm of Zr, 7 ppm of B, 24 ppm of Co and 142 ppm of Al. The content of the gel in the block was 0.01 wt % or less, and toluene and tetrahydrodicyclopentadiene were not observed in the block by GC. Thus, it was found that most of the hydrocarbon-based volatile components were distilled off.

REFERENCE EXAMPLE 6

After polymerization was carried out in the same manner as in Reference Example 2, the polymer solution was left to stand in the air for 16 hours. Thereafter, a hydrogenation reaction was carried out, and the same post-treatment as in Reference Example 2 was conducted. Lactic acid and water were added to carry out a reaction, and the reaction solution was filtered. However, filterability was extremely low, so that a filtrate was obtained by exchanging a filter, Celite and flannel twice. Thereafter, a pellet was obtained in the same manner as in Reference Example 2. The pellet had a reduced viscosity $\eta_{sp}/c$ of 0. 45 dl/g (toluene solution having a concentration of 0.5 g/dl, 30° C.), a glass transition temperature of 149° C., and a degree of hydrogenation of 99.9% or more (double bond signals were not observed when measured by $^1$H-NMR). The amounts of residual metals were very small with 0.1 ppm or less of Zr, 0.1 ppm or less of B, 0.6 ppm of Co and 1.6 ppm of Al. However, the content of the gel in the pellet was large at 1.3 wt %. Toluene, tetrahydrodicyclopentadiene and tetrahydronaphthalene were not observed in the pellet by GC. Thus, it was found that most of the hydrocarbon-based volatile components were distilled off.

EXAMPLE 4

Injection molding was carried out with an injection molding machine using the pellet of the hydrogenated ethylene-dicyclopentadiene copolymer obtained in Reference Example 2. The melting temperature of the resin in the cylinder was set to 280° C. and the temperature of the mold to 80° C. to mold a disk having a diameter of 3.5 cm and a thickness of 2 mm. The obtained disk had a total light transmittance of 90%, a Δb value of 0.30, high transparency and little coloration. There was observed neither a silver streak on its surface nor distortion.

EXAMPLE 5

A disk was molded using the resin obtained in Reference Example 3 and the same injection molding machine as in Example 4. When molding was carried out at a melting temperature of 320° C. and a mold temperature of 80° C., a molded disk was obtained that had a total light transmittance of 90%, a Δb value of 0.40, high transparency and little coloration. There was observed neither a silver streak on its surface nor distortion as in Example 4.

EXAMPLE 6

A CD substrate having a diameter of 12 cm and a thickness of 1.2 mm was molded using the resin obtained in Reference Example 2 and an injection molding machine for optical disk substrates. A stamper for CD-ROM was used. When moldingwas carried out at a resin melting temperature of 300° C., a mold temperature of 90° C. and a cycle time of 7 sec, a disk substrate with little coloration and high transparency was obtained. The disk substrate had a total light transmittance of 90% and a Δb value of 0.54. A silver streak was not observed on its surface. The disk substrate had satisfactory mechanical properties with small distortions in both a circumferential direction and a radial direction of the disk substrate. When the disk surface on the stamper side was observed using an atomic force microscope (AFM) to check pit transferability, transferability was so satisfactory that pits were well transferred according to the shape of the stamper. The surface was little roughened and the number of microvoids was small. When the in-plane birefringence of the disk substrate was measured in the radial direction, the maximum value was 35 nm (measurement wavelength of 633 nm, single pass). When the reduced viscosity of the molded disk substrate was measured, $\eta_{sp}/c$ was the same as that before molding, which was 0.40 dl/g. This means that there was no reduction in molecular weight by molding.

EXAMPLE 7

The resin melting temperature was elevated to 340° C. and the mold temperature to 100° C. in an injection molding test in Example 6 to mold a CD, and a disk substrate with little coloration and high transparency was obtained in the same manner as in Example 6. The disk substrate had a total light transmittance of 89% and a Δb value of 0.65. A silver streak was not observed on its surface. The disk substrate had satisfactory mechanical properties with small distortions in both a circumferential direction and a radial direction of the disk substrate. When the disk substrate was observed under an AFM, pit transferability was satisfactory, the surface was little roughened, and the number of microvoids was small. When the in-plane birefringence of the disk substrate was measured in a radial direction, the maximum value was 15 nm (measurement wavelength of 633 nm, single pass). The disk substrate had a reduced viscosity $\eta_{sp}/c$ of 0.40 dl/g, which was the same as that before molding. This means that there was no reduction in molecular weight by molding.

EXAMPLE 8

The resin of Reference Example 2 and the injection molding machine used in Example 6 were used and the mold was replaced with a mold for a digital video disk to mold a DVD substrate having a diameter of 12 cm and a thickness of 0.6 mm. A stamper for DVD-ROM was used. When molding was carried out at a resin melting temperature of 370° C., a mold temperature of 110° C. and a cycle time of 9.3 sec, a disk substrate with little coloration and high transparency was obtained. The disk substrate had a total light transmittance of 89% and a Δb value of 0.70. A silver streak was not observed on its surface. The disk substrate had satisfactory mechanical properties with small distortions in both a circumferential direction and a radial direction of the disk substrate. When the disk surface on the stamper side was observed under an AFM, transferability was so satisfactory that pits were well transferred according to the shape of the stamper. The surface was little roughened and the number of microvoids was small. When the in-plane birefringence of the disk substrate was measured in a radial direction, the maximum value was 10 nm (measurement wavelength of 633 nm, single pass). The molded disk substrate had a reduced viscosity $\eta_{sp}/c$ of 0.40 dl/g, which was the same as that before molding. This means that there was no reduction in molecular weight by molding.

COMPARATIVE EXAMPLE 2

An attempt was made to mold a CD substrate from the resin obtained in Reference Example 4 under the same conditions as in Example 6. However, when the resin was injected into the mold and then taken out by opening the mold, the molded product was broken due to its brittleness. Thus, a disk substrate could not be molded.

COMPARATIVE EXAMPLE 3

A CD substrate was molded in the same manner as in Example 6 except that the resin obtained in Reference Example 2 was used and that the resin melting temperature was set to 400° C. The obtained disk substrate was burred. It had a total light transmittance of 87% and was slightly colored with a Δb value of 1.36. A silver streak was slightly observed on its surface. The disk substrate had satisfactory mechanical properties with small distortions in both a circumferential direction and a radial direction of the disk substrate. When the disk substrate was measured by an AFM, pit transferability was satisfactory but higher surface roughness and more microvoids than those of Example 6 were observed. The molded disk substrate had a reduced viscosity $\eta_{sp}/c$ of 0.38 dl/g, which was a little lower than that before molding. This means that the decomposition of the resin took place during molding.

COMPARATIVE EXAMPLE 4

A CD substrate was molded in the same manner as in Example 7 except that the resin obtained in Reference Example 2 was used and that the mold temperature was set to 140° C. The obtained substrate had a total light transmittance of 90%, high transparency with a Δb value of 0.46 and a maximum birefringence of 10 nm. Thus, the substrate was satisfactory in terms of optical properties. However, since extremely large distortions in both a circumferential direction and a radial direction of the substrate were observed on its surface, it could not be used as a disk substrate.

COMPARATIVE EXAMPLE 5

A disk was molded using the rein obtained in Reference Example 5 under the same conditions as in Example 4. The obtained disk had a total light transmittance of 75% and a Δb value of 3.86, very distinct coloration and poor transparency. Therefore, it could not be used as an optical material.

COMPARATIVE EXAMPLE 6

A disk was molded using the resin obtained in Reference Example 6 under the same conditions as in Example 4. The obtained disk had a total light transmittance of 82% and a Δb value of 2.06. Although the disk was not so distinctly colored, it had many silver streaks and burning and was very hazy and poor in transparency.

COMPARATIVE EXAMPLE 7

For comparison, in the step of removing the final solvent in Reference Example 2, the removal of a solvent was terminated while tetrahydronaphthalene was still distilling off at a high temperature and a reduced pressure to obtain a hydrogenated α-olefin-dicyclopentadiene copolymer containing 1.8 wt % of tetrahydronaphthalene. When a disk was molded from the resin in the same manner as in Example 4, it had a low total light transmittance of 83%, and many silver streaks and many microvoids were observed on its surface.

What is claimed is:

1. A process for producing a hydrogenated α-olefin-dicyclopentadiene copolymer comprising:
    (1) the step of addition-polymerization of an α-olefin having 2 or more carbon atoms and dicyclopentadiene in a hydrocarbon solvent in the presence of a polymerization catalyst, and then removing the polymerization catalyst as required, to produce an α-olefin-dicyclopentadiene copolymer solution containing unreacted dicyclopentadiene;
    (2) the step of adding a hydrogenation catalyst to the copolymer solution produced in the step (1) to hydrogenate the unsaturated double bonds of the α-olefin-dicyclopentadiene copolymer so as to produce a mixture containing a hydrogenated α-olefin-dicyclopentadiene copolymer; and
    (3) the step of distilling off tetrahydrodicyclopentadiene formed in the hydrogenation reaction of the step (2) from the mixture containing a hydrogenated α-olefin-dicyclopentadiene copolymer produced in the previous step,
    wherein at least one of the following operations (i), (ii) and (iii) is carried out to ensure that a high-boiling hydrocarbon solvent is existent in an amount of at least 10 parts by weight based on 100 parts by weight of the hydrogenated α-olefin-dicyclopentadiene copolymer at the end of the step (3):
        (i) use of a high-boiling hydrocarbon solvent as at least part of the hydrocarbon solvent of the step (1),
        (ii) addition of a high-boiling hydrocarbon solvent in the step (2), and
        (iii) addition of a high-boiling hydrocarbon solvent in the step (3); and the high-boiling hydrocarbon solvent contains at least a hydrocarbon solvent having a boiling point at normal pressure of 195 to 300° C. and an ignition point of 260° C. or more.

2. The process of claim 1, wherein the steps of removing the polymerization catalyst and/or the hydrogenation catalyst from the mixture containing the hydrogenated α-olefin-dicyclopentadiene copolymer is further carried out after the step (2) or the step (3).

3. The process of claim 1, wherein the hydrocarbon solvent in the step (1) consists essentially of a high-boiling hydrocarbon solvent.

4. The process of claim 1, which carries out only the above operation (i).

5. The process of claim 1, which carries out only the above operation (ii).

6. The process of claim 1, wherein the high-boiling hydrocarbon solvent has a melting point of 50° C. or less.

7. The process of claim 1, wh erein the high-boiling hydrocarbon solvent is at least one member selected from the group consisting of 1-methylnaphthalene, 2-methylnaphthalene and tetrahydronaphthalene.

8. The process of claim 1, wherein the polymerization ca talyst is a metallocene-based catalyst.

9. The process of claim 8, wherein the metallocene-based catalyst comprises a co-catalyst and a compound of the group IV transition metal that contains a ligand having a cyclopentadienyl skeleton.

10. The process of claim 9, wherein the transition metal contained in the metallocene-based catalyst is zirconium and the co-catalyst is an aluminoxane.

11. The process of claim 9, wherein the transition metal contained in the metallocene-based catalyst is zirconium and the co-catalyst comprises an ionic boron compound and an alkylating agent.

12. The process of claim 1, wherein the polymerization catalyst is a Ziegler-based catalyst.

13. The process of claim 1, wherein the α-olefin is ethylene.

14. The process of claim 1, wherein the hydrogenated α-olefin-dicyclopentadiene copolymer is obtained as a high-boiling hydrocarbon solvent solution.

15. A process for producing a hydrogenated α-olefin-dicyclopentadiene copolymer comprising:
    (1') the step of addition-polymerization of an α-olefin having 2 or more carbon atoms and dicyclopentadiene in a hydrocarbon solvent in the presence of a polymerization catalyst, and then removing the polymerization catalyst as required, to produce an α-olefin-dicyclopentadiene copolymer solution containing unreacted dicyclopentadiene;
    (2') the step of distilling off the unreacted dicyclopentadiene from the α-olefin-dicyclopentadiene copolymer solution containing the unreacted dicyclopentadiene produced in the step (1') to produce an α-olefin-dicyclopentadiene copolymer solution containing substantially no dicyclopentadiene; and
    (3') the step of adding a hydrogenation catalyst to the α-olefin-dicyclopentadiene copolymer solution produced in the previous step to hydrogenate the unsaturated double bonds of the α-olefin-dicyclopentadiene copolymer to produce a mixture containing a hydrogenated α-olefin-dicyclopentadiene copolymer,
    wherein at least one of the following operations (i') and (ii') is carried out to ensure that a high-boiling hydrocarbon solvent is existent in an amount of at least 10 parts by weight based on 100 parts by weight of the α-olefin-dicyclopentadiene copolymer at the end of the above step (2'):
        (i') use of a high-boiling hydrocarbon solvent as at least part of the hydrocarbon solvent of step (1'), and
        (ii') addition of a high-boiling hydrocarbon solvent in step (2'); and the high-boiling hydrocarbon solvent contains at least a hydrocarbon solvent having a boiling point at normal pressure of 195 to 30° C. and an ignition point of 260° C. or more.

16. The process of claim 15, wherein the step of removing the polymerization catalyst from the α-olefin-dicyclopentadiene copolymer solution is carried out after the step (2').

17. The process of claim 15, wherein the step of removing the polymerization catalyst and/or the hydrogenation catalyst from the mixture containing the hydrogenated α-olefin-dicyclopentadiene copolymer is further carried out after the step (3').

18. The process of claim 15, wherein the hydrocarbon solvent in the step (1') consists essentially of a high-boiling hydrocarbon solvent.

19. The process of claim 15, which carries out only the above operation (i').

20. The process of claim 15, wherein the high-boiling hydrocarbon solvent has a melting point of 50° C. or less.

21. The process of claim 15, wherein the high-boiling hydrocarbon solvent is at least one member selected from the group consisting of 1-methylnaphthalene, 2-methylnaphthalene and tetrahydronaphthalene.

22. The process of claim 15, wherein the polymerization catalyst is a metallocene-based catalyst.

23. The process of claim 22, wherein the metallocene-based catalyst comprises a co-catalyst and a compound of the group IV transition metal that contains a ligand having a cyclopentadienyl skeleton.

24. The process of claim 23, wherein the transition metal contained in the metallocene-based catalyst is zirconium and the co-catalyst is an aluminoxane.

25. The process of claim 23, wherein the transition metal contained in the metallocene-based catalyst is zirconium and the co-catalyst comprises an ionic boron compound and an alkylating agent.

26. The process of claim 15, wherein the polymerization catalyst is a Ziegler-based catalyst.

27. The process of claim 15, wherein the α-olefin is ethylene.

28. The process of claim 15, wherein the hydrogenated α-olefin-dicyclopentadiene copolymer is obtained as a high-boiling hydrocarbon solvent solution.

* * * * *